United States Patent
Ito et al.

(10) Patent No.: US 6,959,195 B2
(45) Date of Patent: Oct. 25, 2005

(54) TRANSMISSION-SIDE MOBILE UNIT, RECEPTION-SIDE MOBILE UNIT, INFORMATION COMMUNICATION SYSTEM, INFORMATION COMMUNICATION METHOD, AND SERVER APPARATUS

(75) Inventors: Makoto Ito, Yokosuka (JP); Yasutaka Urakawa, Yokohama (JP); Takashi Kadohiro, Yokohama (JP); Hiroaki Tomoda, Yokohama (JP); Seiji Hoshi, Yokosuka (JP); Motoyuki Uchida, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 393 days.

(21) Appl. No.: 10/385,717

(22) Filed: Mar. 12, 2003

(65) Prior Publication Data

US 2003/0220125 A1 Nov. 27, 2003

(30) Foreign Application Priority Data

Mar. 12, 2002 (JP) ........................................ 2002-067234

(51) Int. Cl.$^7$ .............................................. H04Q 7/20
(52) U.S. Cl. .................................... 455/466; 455/412.1
(58) Field of Search .............................. 455/412.1, 413, 455/418, 419, 420, 466, 518, 519

(56) References Cited

U.S. PATENT DOCUMENTS

| | | | | |
|---|---|---|---|---|
| 6,088,596 A | * | 7/2000 | Kawakami et al. | ......... 455/466 |
| 6,397,040 B1 | * | 5/2002 | Titmuss et al. | .......... 455/67.11 |
| 6,480,715 B1 | * | 11/2002 | Pentikainen | ................. 455/433 |
| 6,600,930 B1 | * | 7/2003 | Sakurai et al. | ............ 455/414.3 |
| 6,694,136 B2 | * | 2/2004 | Uda | ............................ 370/328 |
| 6,760,730 B1 | | 7/2004 | Kataoka | |

FOREIGN PATENT DOCUMENTS

| | | |
|---|---|---|
| CN | 1300067 A | 6/2001 |
| CN | 1304620 A | 7/2001 |
| JP | 11-065950 | 3/1999 |
| JP | 11-096113 | 4/1999 |
| JP | 2001-128242 | 5/2001 |
| WO | WO 99/66746 | 12/1999 |

* cited by examiner

*Primary Examiner*—Bing Q. Bui
(74) *Attorney, Agent, or Firm*—Oblon, Spivak, McClelland, Maier & Neustadt, P.C.

(57) ABSTRACT

An information communication system 1 according to the present invention is comprised of a cellular phone 10 having a data storage 11, a data list transmitter 13, and a data transmitter 16; and a cellular phone 20 having a check list DB 21 and a data receiver 26. The cellular phone 10 makes the data list transmitter 13 transmit a data list of content data stored in the data storage 11, to the cellular phone 20. The cellular phone 20 collates the data list with a check list stored in the check list DB 21 to generate a request list, and transmits the request list to the cellular phone 10. The cellular phone 10 extracts the content data recorded in the received request list from the data storage 11 and transmits the content data to the cellular phone 20. The cellular phone 20 receives the content data through the data receiver 26.

18 Claims, 19 Drawing Sheets

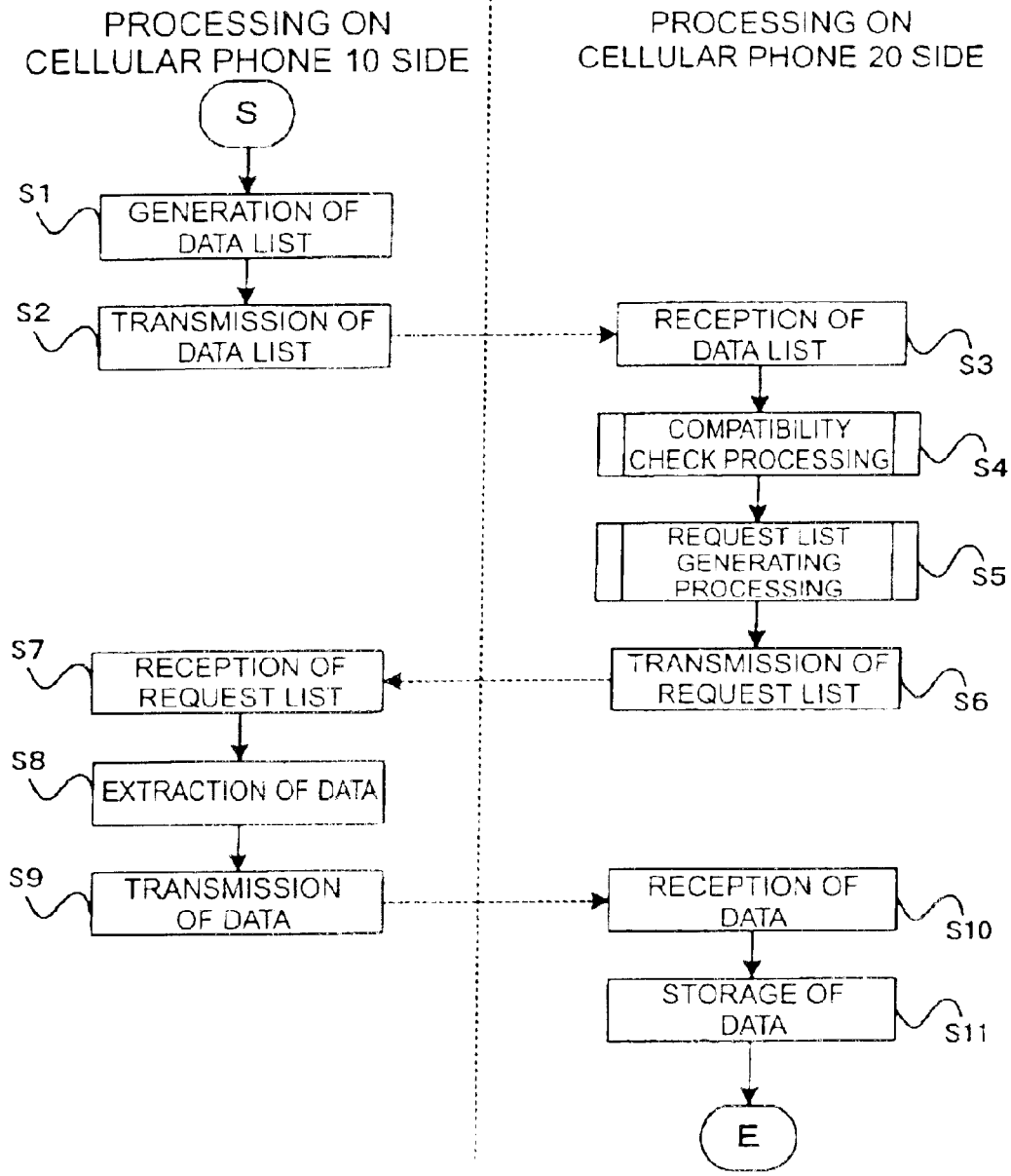

Fig.4

| ID | FILE NAME | DATA TYPE | DATA FORMAT | ACQUISITION/ UPDATE DATA | DATA SIZE | OPTION DATA LIST NUMBER |
|---|---|---|---|---|---|---|
| 1 | A1.xxx | MAIL | STANDARD FORMAT | 2002/1/10 | 10KB | — |
| 2 | A2.xxx | SCHEDULE | STANDARD FORMAT | 2002/1/11 | 1KB | — |
| 3 | A3.xxx | ADDRESS BOOK | STANDARD FORMAT | 2002/1/11 | 0.5KB | — |
| 4 | A4.xxx | BOOK MARK | STANDARD FORMAT | 2002/1/12 | 1KB | — |
| 5 | A5.xxx | USER DICTIONARY | STANDARD FORMAT | 2002/1/13 | 1KB | — |
| 6 | A6.xxx | FORMATTED REPORT | STANDARD FORMAT | 2002/1/14 | 1KB | — |
| 7 | A7.xxx | INCOMING/ OUTGOING CALL HISTORY | STANDARD FORMAT | 2002/1/15 | 1KB | — |
| 8 | A8.xxx | PROFILE INFORMATION | STANDARD FORMAT | 2002/1/16 | 3KB | — |
| 9 | A9.xxx | VARIOUS SETTINGS | STANDARD FORMAT | 2002/1/17 | 1KB | — |
| 10 | A10.xxx | SCREEN MEMO | STANDARD FORMAT | 2002/1/18 | 5KB | 1 |
| 11 | B10.xxx | SCREEN MEMO | STANDARD FORMAT | 2002/1/19 | 1KB | 1 |
| 12 | A11.xxx | VOICE MEMO/ CALL ANSWERING MEMO | STANDARD FORMAT | 2002/1/20 | 1KB | — |
| 13 | B11.xxx | VOICE MEMO/ CALL ANSWERING MEMO | STANDARD FORMAT | 2002/1/21 | 1KB | — |
| 14 | A12.xxx | TEXT MEMO | STANDARD FORMAT | 2002/1/22 | 0.3KB | — |
| 15 | B12.xxx | TEXT MEMO | STANDARD FORMAT | 2002/1/23 | 1KB | — |
| 16 | C12.xxx | TEXT MEMO | STANDARD FORMAT | 2002/1/24 | 0.5KB | — |
| 17 | A13.xxx | MESSAGE R/F | STANDARD FORMAT | 2002/1/25 | 1KB | — |
| 18 | B13.xxx | MESSAGE R/F | STANDARD FORMAT | 2002/1/26 | 1KB | — |
| 19 | C13.xxx | MESSAGE R/F | STANDARD FORMAT | 2002/1/27 | 4KB | — |
| 20 | A14.xxx | RINGING MELODY | MFI | 2002/1/28 | 2KB | 2 |
| 21 | B14.xxx | RINGING MELODY | MFI2 | 2002/1/29 | 2KB | 0 |
| 22 | C14.xxx | RINGING MELODY | MIDI | 2002/1/30 | 2KB | 2 |
| 23 | A15.xxx | IMAGE (GIF/JPEG) | GIF87a | 2002/1/31 | 10KB | 0 |
| 24 | B15.xxx | IMAGE (GIF/JPEG) | GIF89a | 2002/2/1 | 15KB | 1 |
| 25 | C15.xxx | IMAGE (GIF/JPEG) | JFIF | 2002/2/2 | 10KB | 1 |
| 26 | D15.xxx | IMAGE (GIF/JPEG) | CIFF | 2002/2/3 | 20KB | 1 |
| 27 | E15.xxx | IMAGE (GIF/JPEG) | EXIF | 2002/2/4 | 10KB | 1 |
| 28 | F15.xxx | IMAGE (GIF/JPEG) | JFXX | 2002/2/5 | 15KB | 1 |
| 29 | G15.xxx | IMAGE (GIF/JPEG) | BMP | 2002/2/6 | 10KB | 1 |
| 30 | A16.xxx | MOVING PICTURE | M-PEG4 | 2002/2/7 | 50KB | 1 |
| 31 | B16.xxx | MOVING PICTURE | ASF | 2002/2/8 | 100KB | 1 |
| 32 | A17.xxx | APPLICATION/ SCRATCH PAD | ADF + JAR + ScratchPad | 2002/2/9 | 20KB | 3 |
| 33 | A18.xxx | music | MP3 | 2002/2/10 | 20KB | 2 |
| 34 | B18.xxx | music | AAC | 2002/2/11 | 30KB | 2 |
| 35 | C18.xxx | music | ATRAC3 | 2002/2/12 | 25KB | 2 |
| 36 | D18.xxx | music | WMA | 2002/2/13 | 20KB | 2 |

| ID | FILE NAME | ADF FILE |
|---|---|---|
| 32 | A17.xxx | AppName = GAME DEMONSTRATION<br>KvmVer = CLDC-1.0<br>AppClass = game.GameDemo<br>AppVer = 1.0<br>PackageURL = http://gameserver.com:8080/GameDemo.jar<br>AppSize = 1000<br>LastModified = Sat, 26 Jan 2002 20:00:10 |

| RESOLUTION | NUMBER OF COLORS | NUMBER OF SOUNDS | ATTACHMENT RESTRICTIONS |
|---|---|---|---|
| 120 × 160DOTS OR LESS | 65536COLORS OR LESS | 16CHORDS OR LESS | RECEIVE MAX1(UP TO APPROX.100KB IN ADDITION TO MAIN TEXT)<br>TRANSMIT MAX1(UP TO APPROX.100KB IN ADDITION TO MAIN TEXT) |

| ID | DATA TYPE | DATA FORMAT | DATA SIZE |
|---|---|---|---|
| 1 | MAIL | STANDARD FORMAT | 20KB OR LESS |
| 2 | SCHEDULE | STANDARD FORMAT | 10KB OR LESS |
| 3 | ADDRESS BOOK | STANDARD FORMAT | 10KB OR LESS |
| 4 | BOOK MARK | STANDARD FORMAT | 10KB OR LESS |
| 5 | USER DICTIONARY | STANDARD FORMAT | 5KB OR LESS |
| 6 | FORMATTED REPORT | STANDARD FORMAT | 5KB OR LESS |
| 7 | INCOMING/OUTGOING CALL HISTORY | STANDARD FORMAT | 5KB OR LESS |
| 8 | PROFILE INFORMATION | STANDARD FORMAT | 5KB OR LESS |
| 9 | VARIOUS SETTINGS | STANDARD FORMAT | 10KB OR LESS |
| 10 | SCREEN MEMO | STANDARD FORMAT | 10KB OR LESS |
| 11 | VOICE MEMO/CALL ANSWERING MEMO | STANDARD FORMAT | 10KB OR LESS |
| 12 | TEXT MEMO | STANDARD FORMAT | 10KB OR LESS |
| 13 | MESSAGE R/F | STANDARD FORMAT | 10KB OR LESS |
| 14 | RINGING MELODY | MFI2 | 10KB OR LESS |
| 15 | RINGING MELODY | MIDI | 10KB OR LESS |
| 16 | IMAGE (GIF/JPEG) | GIF87 | 20KB OR LESS |
| 17 | IMAGE (GIF/JPEG) | GIF87a | 20KB OR LESS |
| 18 | IMAGE (GIF/JPEG) | GIF89a | 20KB OR LESS |
| 19 | IMAGE (GIF/JPEG) | EXIF | 20KB OR LESS |
| 20 | IMAGE (GIF/JPEG) | JFXX | 20KB OR LESS |
| 21 | IMAGE (GIF/JPEG) | BMP | 20KB OR LESS |
| 22 | MOVING PICTURE | M-PEG4 | 30KB OR LESS |
| 23 | APPLICATION/SCRATCHPAD | ADF+JAR+ScrachPad | 50KB OR LESS |
| 24 | music | MP3 | 100KB OR LESS |
| 25 | music | AAC | 100KB OR LESS |
| 26 | music | ATRAC3 | 100KB OR LESS |

| ID | FILE NAME | COMPATIBILITY RESULT | DATA FORMAT | ACQUISITION/ UP DATE |
|---|---|---|---|---|
| 1 | A1.xxx | ○ | STANDART FORMAT | 2002/1/10 |
| 2 | A2.xxx | ○ | STANDART FORMAT | 2002/1/11 |
| 3 | A3.xxx | ○ | STANDART FORMAT | 2002/1/11 |
| 4 | A4.xxx | ○ | STANDART FORMAT | 2002/1/12 |
| 5 | A5.xxx | ○ | STANDART FORMAT | 2002/1/13 |
| 6 | A6.xxx | ○ | STANDART FORMAT | 2002/1/14 |
| 7 | A7.xxx | ○ | STANDART FORMAT | 2002/1/15 |
| 8 | A8.xxx | ○ | STANDART FORMAT | 2002/1/16 |
| 9 | A9.xxx | ○ | STANDART FORMAT | 2002/1/17 |
| 10 | A10.xxx | ○ | STANDART FORMAT | 2002/1/18 |
| 11 | B10.xxx | ○ | STANDART FORMAT | 2002/1/19 |
| 12 | A11.xxx | ○ | STANDART FORMAT | 2002/1/20 |
| 13 | B11.xxx | ○ | STANDART FORMAT | 2002/1/21 |
| 14 | A12.xxx | ○ | STANDART FORMAT | 2002/1/22 |
| 15 | B12.xxx | ○ | STANDART FORMAT | 2002/1/23 |
| 16 | C12.xxx | ○ | STANDART FORMAT | 2002/1/24 |
| 17 | A13.xxx | ○ | STANDART FORMAT | 2002/1/25 |
| 18 | B13.xxx | ○ | STANDART FORMAT | 2002/1/26 |
| 19 | C13.xxx | ○ | STANDART FORMAT | 2002/1/27 |
| 20 | A14.xxx | × | MFI | 2002/1/28 |
| 21 | B14.xxx | ○ | MFI2 | 2002/1/29 |
| 22 | C14.xxx | ○ | MIDI | 2002/1/30 |
| 23 | A15.xxx | ○ | GIF87a | 2002/1/31 |
| 24 | B15.xxx | × | GIF89a | 2002/2/1 |
| 25 | C15.xxx | × | JFIF | 2002/2/2 |
| 26 | D15.xxx | × | CIFF | 2002/2/3 |
| 27 | E15.xxx | ○ | EXIF | 2002/2/4 |
| 28 | F15.xxx | ○ | JFXX | 2002/2/5 |
| 29 | G15.xxx | ○ | BMP | 2002/2/6 |
| 30 | A16.xxx | × | M-PEG4 | 2002/2/7 |
| 31 | B16.xxx | × | ASF | 2002/2/8 |
| 32 | A17.xxx | ○ | ADF+JAR+ScrachPad | 2002/2/9 |
| 33 | A18.xxx | ○ | MP3 | 2002/2/10 |
| 34 | B18.xxx | ○ | AAC | 2002/2/11 |
| 35 | C18.xxx | ○ | ATRAC3 | 2002/2/12 |
| 36 | D18.xxx | × | WMA | 2002/2/13 |

Fig. 16

| | 241a | 241b | 241c | 241d |
|---|---|---|---|---|
| | ID | FILE NAME | DATA TYPE | ACQUISITION/ UP DATE |
| | 1 | A1.xxx | MAIL | 2002/1/10 |
| | 2 | A2.xxx | SCHEDULE | 2002/1/11 |
| | 3 | A3.xxx | ADDRESS BOOK | 2002/1/11 |
| | 4 | A4.xxx | BOOK MARK | 2002/1/12 |
| | 5 | A5.xxx | USER DICTIONARY | 2002/1/13 |
| | 6 | A6.xxx | FORMATTED REPORT | 2002/1/14 |
| | 7 | A7.xxx | INCOMING/ OUTGOING CALL HISTORY | 2002/1/15 |
| | 8 | A8.xxx | PROFILE INFORMATION | 2002/1/16 |
| | 9 | A9.xxx | VARIOUS SETTINGS | 2002/1/17 |
| | 10 | A10.xxx | SCREEN MEMO | 2002/1/18 |
| | 11 | B10.xxx | SCREEN MEMO | 2002/1/19 |
| | 12 | A11.xxx | VOICE MEMO/ CALL ANSWERING MEMO | 2002/1/20 |
| | 13 | B11.xxx | VOICE MEMO/ CALL ANSWERING MEMO | 2002/1/21 |
| | 14 | A12.xxx | TEXT MEMO | 2002/1/22 |
| | 15 | B12.xxx | TEXT MEMO | 2002/1/23 |
| | 16 | C12.xxx | TEXT MEMO | 2002/1/24 |
| | 17 | A13.xxx | MESSAGE R/F | 2002/1/25 |
| | 18 | B13.xxx | MESSAGE R/F | 2002/1/26 |
| | 19 | C13.xxx | MESSAGE R/F | 2002/1/27 |
| | 21 | B14.xxx | RINGING MELODY | 2002/1/29 |
| | 22 | C14.xxx | RINGING MELODY | 2002/1/30 |
| | 23 | A15.xxx | IMAGE (GIF/JPEG) | 2002/1/31 |
| | 27 | E15.xxx | IMAGE (GIF/JPEG) | 2002/2/4 |
| | 28 | F15.xxx | IMAGE (GIF/JPEG) | 2002/2/5 |
| | 29 | G15.xxx | IMAGE (GIF/JPEG) | 2002/2/6 |
| | 32 | A17.xxx | APPLICATION/SCRATCHPAD | 2002/2/9 |
| | 33 | A18.xxx | music | 2002/2/10 |
| | 34 | B18.xxx | music | 2002/2/11 |
| | 35 | C18.xxx | music | 2002/2/12 |
| | 36 | D18.xxx | music | 2002/2/13 |

| DATA TYPE | MAX | NUMBER OF DATA (TOTAL) | NUMBER OF DATA (COMPATIBLE) | NUMBER OF DATA TO BE DELETED |
|---|---|---|---|---|
| RINGING MELODIES | 2 | 3 | 2 | — |
| IMAGES (GIF/JPEG) | 3 | 7 | 4 | 1 |
| APPLICATIONS/SCRATCHPADS | 10 | 1 | 1 | — |
| TEXT MEMOS | 2 | 3 | 3 | 1 |
| SCREEN MEMOS | 10 | 2 | 2 | — |
| music | 2 | 4 | 3 | 1 |

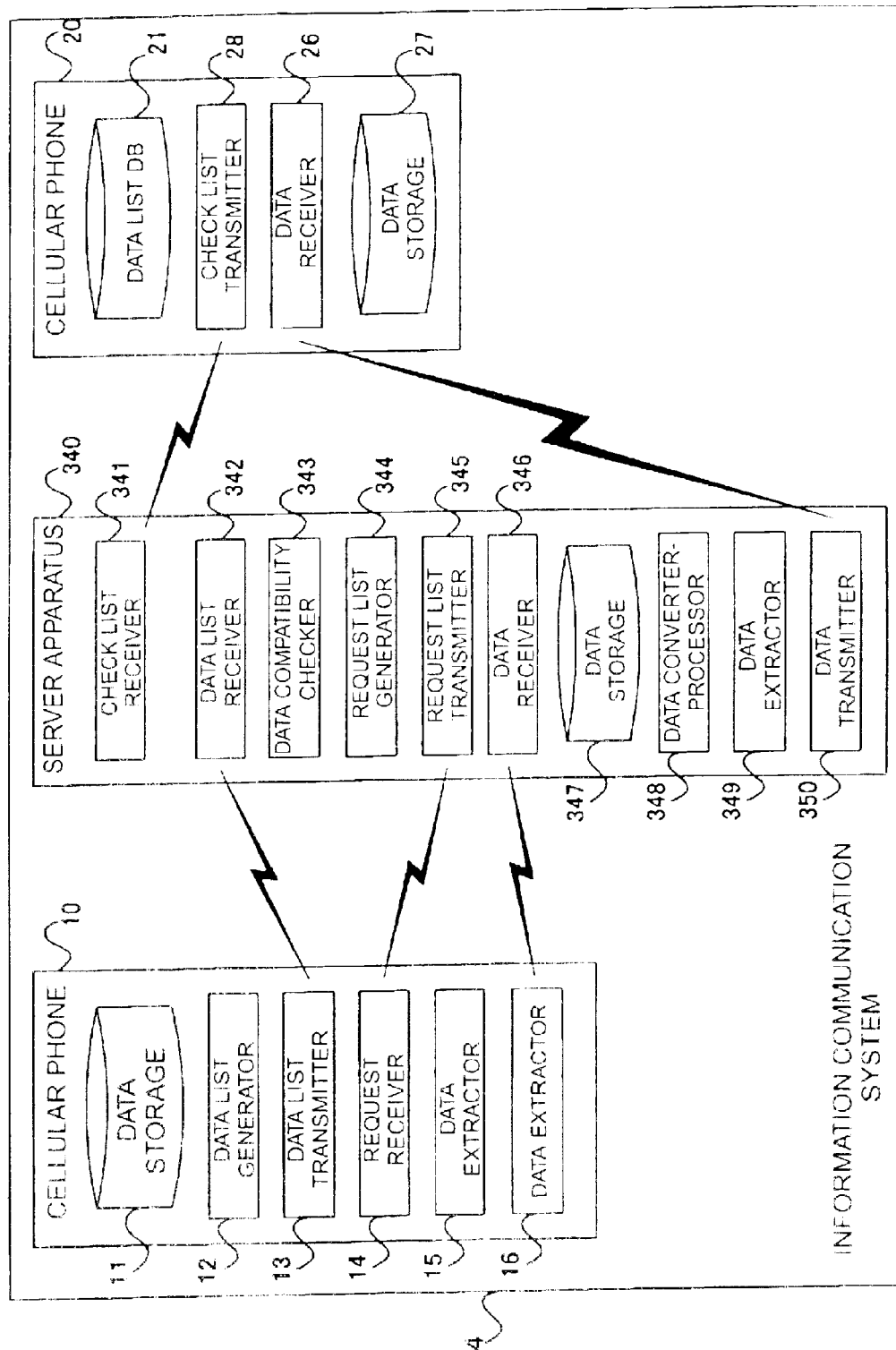

TRANSMISSION-SIDE MOBILE UNIT, RECEPTION-SIDE MOBILE UNIT, INFORMATION COMMUNICATION SYSTEM, INFORMATION COMMUNICATION METHOD, AND SERVER APPARATUS

BACKGROUND OF THE INVENTION

1. Field of the Invention

The present invention relates to a transmission-side mobile unit, a reception-side mobile unit, an information communication system, an information communication method, and a server apparatus.

2. Related Background Art

In recent years, the development of information communication technology has provoked transmission and reception of data such as documents, images, etc. through networks including the Internet. Particularly, in the case of mobile units such as cellular phones and the like, data of an address book, a user dictionary, etc. is transferred to another mobile unit on the occasion of switching between models, where the same user uses a plurality of mobile units, and so on. This permits the user of the mobile units to continuously use the data having been used in the old mobile unit, in the new mobile unit as well.

SUMMARY OF THE INVENTION

The prior art described above, however, had the following problem. Namely, the terminal equipment such as personal computers and the like uses wire links for transmission and reception of data, while the mobile units such as the cellular phones and the like use radio links for transmission and reception of data. Therefore, if, on the occasion of transferring the data from one mobile unit to another mobile unit, all the data stored in the old mobile unit is transmitted to the new mobile unit, the volume of transmitted data will become high, so as to consume immense wireless resources or wired resources.

An object of the present invention is therefore to solve the above problem and provide a transmission-side mobile unit, a reception-side mobile unit, an information communication system, an information communication method, and a server apparatus capable of implementing efficient transfer of data between mobile units.

In order to solve the above problem, a transmission-side mobile unit according to the present invention is a transmission-side mobile unit comprising: data storage means for storing data; list transmitting means for transmitting a data list of data stored in the data storage means, to a reception-side mobile unit; data extracting means for extracting data selected out of the data list transmitted by the list transmitting means, from the data storage means in response to a request from the reception-side mobile unit; and data transmitting means for transmitting the data extracted by the data extracting means, to the reception-side mobile unit.

A reception-side mobile unit according to the present invention is a reception-side mobile unit comprising: list receiving means for receiving a data list from the above-stated transmission-side mobile unit; list storage means for storing a check list for determining data compatibility in the reception-side mobile unit; data selecting means for collating the data list received by the list receiving means, with the check list stored in the list storage means to select data with data compatibility in the reception-side mobile unit; and data receiving means for receiving the data selected by the data selecting means, from the transmission-side mobile unit.

The present invention may also be applied to construction and operation of an information communication system comprising the foregoing transmission-side mobile unit and the foregoing reception-side mobile unit and configured to implement transmission and reception of data between the transmission-side mobile unit and the reception-side mobile unit.

An information communication method according to the present invention is an information communication method of implementing transmission and reception of data between a transmission-side mobile unit and a reception-side mobile unit, the information communication method comprising: a list transmitting step wherein the transmission-side mobile unit transmits a data list of data stored in data storage means, to the reception-side mobile unit; a list receiving step wherein the reception-side mobile unit receives the data list transmitted from the transmission-side mobile unit in the list transmitting step; a data selecting step wherein the reception-side mobile unit collates the data list received in the list receiving step, with a check list for determining data compatibility in the reception-side mobile unit to select data with data compatibility in the reception-side mobile unit; a data extracting step wherein the transmission-side mobile unit extracts data selected out of the data list transmitted in the list transmitting step, from the data storage means in response to a request from the reception-side mobile unit; a data transmitting step wherein the transmission-side mobile unit transmits the data extracted in the data extracting step, to the reception-side mobile unit; and a data receiving step wherein the reception-side mobile unit receives the data transmitted in the data transmitting step, from the transmission-side mobile unit.

According to these aspects of the invention, for transferring data from the transmission-side mobile unit to the reception-side mobile unit, the data list of the data stored in the transmission-side mobile unit is first transmitted from the transmission-side mobile unit to the reception-side mobile unit, prior to the transmission of the data. Then the data selected by the reception-side mobile unit on the basis of compatibility of data is transmitted to the reception-side mobile unit. Therefore, the volume of transmitted data becomes lower than in the case where all the data stored in the transmission-side mobile unit is transmitted to the reception-side mobile unit, whereby the wireless resources or wired resources used can be reduced. It is also feasible to avoid storage of data incompatible between the transmission-side mobile unit and the reception-side mobile unit, in the reception-side mobile unit. As a consequence, it becomes feasible to implement efficient transfer of data between the mobile units.

Preferably, the reception-side mobile unit according to the present invention is configured so that the data list includes information about data volume and so that the data selecting means selects the data which the reception-side mobile unit requests the transmission-side mobile unit to transmit, on the basis of the information about data volume included in the data list.

Preferably, the information communication method according to the present invention is configured so that the data list includes information about data volume and so that the data selecting step is to select the data which the reception-side mobile unit requests the transmission-side mobile unit to transmit, on the basis of the information about data volume included in the data list.

According to these aspects of the invention, the reception-side mobile unit requests the transmission-side mobile unit to transmit data within the range of storable data volume in the reception-side mobile unit, and the reception-side mobile unit is thus able to store all the data received from the transmission-side mobile unit. Accordingly, it becomes feasible to implement quick data transfer without wasteful data transmission.

Preferably, the reception-side mobile unit according to the present invention is configured so that the data list includes information about image data and so that the data selecting means selects the data which the reception-side mobile unit requests the transmission-side mobile unit to transmit, with reference to the information about image data included in the data list.

Preferably, the information communication method according to the present invention is configured so that the data list includes information about image data and so that the data selecting step is to select the data which the reception-side mobile unit requests the transmission-side mobile unit to transmit, with reference to the information about image data included in the data list.

The image data includes much more information about attributes including the resolution, the number of colors, etc. and has more data formats than text data. By referencing the information about such image data, it is feasible to achieve easy and accurate determination on data compatibility and to implement smooth transfer of image data between mobile units of different models or operating systems.

Preferably, the reception-side mobile unit according to the present invention is configured so that the data list includes information about music data and so that the data selecting means selects the data which the reception-side mobile unit requests the transmission-side mobile unit to transmit, with reference to the information about music data included in the data list.

Preferably, the information communication method according to the present invention is configured so that the data list includes information about music data and so that the data selecting step is to select the data which the reception-side mobile unit requests the transmission-side mobile unit to transmit, with reference to the information about music data included in the data list.

The music data includes much more information about attributes including the number of chords and others and has more data formats than the text data. By referencing the information about such music data, it is feasible to achieve easy and accurate determination on data compatibility and to implement smooth transfer of music data between mobile units of different models or operating systems.

Preferably, the reception-side mobile unit according to the present invention is configured so that the data list includes information about the transmission-side mobile unit and so that the data selecting means selects the data which the reception-side mobile unit requests the transmission-side mobile unit to transmit, with reference to the information about the transmission-side mobile unit included in the data list.

Preferably, the information communication method according to the present invention is configured so that the data list includes information about the transmission-side mobile unit and so that the data selecting step is to select the data which the reception-side mobile unit requests the transmission-side mobile unit to transmit, with reference to the information about the transmission-side mobile unit included in the data list.

The mobile units are regulated by a wide variety of restrictions associated with available resolution, the number of colors, the number of sounds generated, the number and volume of attachment files, etc., depending upon their models and operating systems. By referencing the information about the transmission-side mobile unit, it is feasible to prevent unnecessary data compatible with the transmission-side mobile unit but incompatible with the reception-side mobile unit from being transmitted to the reception-side mobile unit. As a consequence, it is also feasible to implement smooth transfer of data between mobile units of different models or operating systems.

Preferably, the reception-side mobile unit according to the present invention is configured so that the data list includes information about the reception-side mobile unit and so that the data selecting means selects the data which the reception-side mobile unit requests the transmission-side mobile unit to transmit, with reference to the information about the reception-side mobile unit included in the data list.

Preferably, the information communication method according to the present invention is configured so that the data list includes information about the reception-side mobile unit and so that the data selecting step is to select the data which the reception-side mobile unit requests the transmission-side mobile unit to transmit, with reference to the information about the reception-side mobile unit included in the data list.

The mobile units are regulated by a wide variety of restrictions associated with available resolution, the number of colors, the number of sounds generated, the number and volume of attachment files, etc., depending upon their models and operating systems. By referencing the information about the reception-side mobile unit, it is feasible to prevent unnecessary data incompatible with the reception-side mobile unit from being transmitted to the reception-side mobile unit. As a consequence, it is also feasible to implement smooth transfer of data between mobile units of different models or operating systems.

A transmission-side mobile unit according to the present invention is a transmission-side mobile unit comprising: data storage means for storing data; list transmitting means for transmitting a data list of data stored in the data storage means, to a server apparatus; data extracting means for extracting data selected out of the data list transmitted by the list transmitting means, from the data storage means; and data transmitting means for transmitting the data extracted by the data extracting means, to the server apparatus.

A reception-side mobile unit according to the present invention is a reception-side mobile unit comprising: list receiving means for receiving a data list from a server apparatus; list storage means for storing a check list for determining data compatibility in the reception-side mobile unit; data selecting means for collating the data list received by the list receiving means, with the check list stored in the list storage means to select data with data compatibility in the reception-side mobile unit; and data receiving means for receiving the data selected by the data selecting means, from the server apparatus.

A server apparatus according to the present invention is a server apparatus configured to implement transmission and reception of data to and from the foregoing transmission-side mobile unit and the foregoing reception-side mobile unit, the server apparatus comprising: data receiving means for receiving data transmitted from the data transmitting means of the transmission-side mobile unit; data extracting means for extracting data to be transmitted to the reception-side mobile unit, out of the data received by the data receiving means, in response to a request from the reception-side mobile unit; and data transmitting means for transmitting the data extracted by the data extracting means, to the reception-side mobile unit.

The present invention may also be applied to construction and operation of an information communication system comprising the foregoing transmission-side mobile unit, the foregoing reception-side mobile unit, and the foregoing server apparatus, and configured to implement transmission and reception of data between the transmission-side mobile unit and the server apparatus and between the server apparatus and the reception-side mobile unit.

An information communication method according to the present invention is an information communication method in which a transmission-side mobile unit implements transmission and reception of data to and from a server apparatus, the information communication method comprising: a list transmitting step wherein the transmission-side mobile unit transmits a data list of data stored in data storage means, to the server apparatus; a data extracting step wherein the transmission-side mobile unit extracts data selected out of the data list transmitted in the list transmitting step, from the data storage means; and a data transmitting step wherein the transmission-side mobile unit transmits the data extracted in the data extracting step, to the server apparatus.

An information communication method according to the present invention is an information communication method in which a reception-side mobile unit implements transmission and reception of data to and from a server apparatus, the information communication method comprising: a list receiving step wherein the reception-side mobile unit receives a data list from the server apparatus; a data selecting step wherein the reception-side mobile unit collates the data list received in the list receiving step, with a check list for determining data compatibility in the reception-side mobile unit to select data with data compatibility in the reception-side mobile unit; and a data receiving step wherein the reception-side mobile unit receives the data selected in the data selecting step, from the server apparatus.

An information communication method according to the present invention is an information communication method in which a server apparatus implements transmission and reception of data to and from a transmission-side mobile unit and a reception-side mobile unit, the information communication method comprising: a data receiving step wherein the server apparatus receives data transmitted from the transmission-side mobile unit; a data extracting step wherein the server apparatus extracts data to be transmitted to the reception-side mobile unit, out of the data received in the data receiving step, in response to a request from the reception-side mobile unit; and a data transmitting step wherein the server apparatus transmits the data extracted in the data extracting step, to the reception-side mobile unit.

According to these aspects of the invention, the transfer of data between the transmission-side mobile unit and the reception-side mobile unit is carried out via the server apparatus. The transmission and reception of data between the server apparatus and the transmission-side mobile unit and between the server apparatus and the reception-side mobile unit may be performed through a cable, IrDA, Bluetooth (registered trademark), wireless LAN, etc., or may be implemented in such a configuration that radio access is used between each mobile unit and the public circuit network and wire connection is used between the public circuit network and the server apparatus. For example, the data is temporarily stored in the server apparatus during a period in which the reception-side mobile unit is not in a communication state, and the data stored is transmitted to the reception-side mobile unit after it turns into the communication state, which enables more secure and efficient data transfer.

Preferably, the server apparatus according to the present invention is configured so as to further comprise data converting means for converting or processing the data received by the data receiving means, into data with data compatibility in the reception-side mobile unit, and so that the data extracting means extracts the data to be transmitted to the reception-side mobile unit, out of the data into which the data converting means converted or processed the received data.

Preferably, the information communication method according to the present invention is configured so as to further comprise a data converting step wherein the server apparatus converts or processes the data received in the data receiving step, into data with data compatibility in the reception-side mobile unit, and so that in the data extracting step the server apparatus extracts the data to be transmitted to the reception-side mobile unit, out of the data into which the received data was converted or processed in the data converting step.

According to these aspects of the invention, the data transmitted from the transmission-side mobile unit to the server apparatus is converted or processed according to need in the server apparatus. Namely, even if the data stored in the transmission-side mobile unit is incompatible with the reception-side mobile unit, the server apparatus can convert or process the data into the data compatible with the reception-side mobile unit. This enables more data to be transferred to the reception-side mobile unit. As a result, the data transfer efficiency is increased.

A server apparatus according to the present invention is a server apparatus configured to implement transmission and reception of data to and from a transmission-side mobile unit and a reception-side mobile unit, the server apparatus comprising: list receiving means for receiving a data list from the transmission-side mobile unit; list storage means for storing a check list for determining data compatibility in the reception-side mobile unit; data selecting means for collating the data list received by the list receiving means, with the check list stored in the list storage means to select data with data compatibility in the reception-side mobile unit; data receiving means for receiving the data selected by the data selecting means, from the transmission-side mobile unit; data extracting means for extracting data to be transmitted to the reception-side mobile unit, out of the data received by the data receiving means; and data transmitting means for transmitting the data extracted by the data extracting means, to the reception-side mobile unit.

The present invention may also be applied to construction and operation of an information communication system comprising a transmission-side mobile unit, a reception-side mobile unit, and the foregoing server apparatus, and configured to implement transmission and reception of data between the transmission-side mobile unit and the server apparatus and between the server apparatus and the reception-side mobile unit.

An information communication method according to the present invention is an information communication method in which a server apparatus implements transmission and reception of data to and from a transmission-side mobile unit and a reception-side mobile unit, the information communication method comprising: a list receiving step wherein the server apparatus receives a data list from the transmission-side mobile unit; a data selecting step wherein the server apparatus collates the data list received in the list receiving step, with a check list for determining data compatibility in the reception-side mobile unit to select data with data compatibility in the reception-side mobile unit; a data receiving step wherein the server apparatus receives the data selected in the data selecting step, from the transmission-side mobile unit; a data extracting step wherein the server apparatus extracts data to be transmitted to the reception-side mobile unit, out of the data received in the data receiving step; and a data transmitting step of transmitting the data extracted in the data extracting step, to the reception-side mobile unit.

According to these aspects of the invention, the server apparatus determines whether the data to be transferred from the transmission-side mobile unit to the reception-side mobile unit is compatible with the reception-side mobile unit. Accordingly, the process load for the transfer of data is reduced on the reception-side mobile unit, as compared with the case where the reception-side mobile unit performs the determination. The data can also be transferred even to the reception-side mobile unit without the compatibility determining function.

Preferably, the server apparatus according to the present invention is configured so as to further comprise data converting means for converting or processing the data received by the data receiving means, into data with data compatibility in the reception-side mobile unit, and so that the data extracting means extracts the data to be transmitted to the reception-side mobile unit, out of the data into which the data converting means converted or processed the received data.

Preferably, the information communication method according to the present invention is configured so as to further comprise a data converting step wherein the server apparatus converts or processes the data received in the data receiving step, into data with data compatibility in the reception-side mobile unit, and so that in the data extracting step the server apparatus extracts the data to be transmitted to the reception-side mobile unit, out of the data into which the received data was converted or processed in the data converting step.

According to these aspects of the invention, the server apparatus converts or processes the data transmitted from the transmission-side mobile unit to the server apparatus, according to need. Namely, even if the data stored in the transmission-side mobile unit is incompatible with the reception-side mobile unit, the server apparatus can convert or process the data into the data compatible with the reception-side mobile unit. This permits more data to be transferred to the reception-side mobile unit. As a result, the data transfer efficiency is increased.

A server apparatus according to the present invention is a server apparatus configured to implement transmission and reception of data to and from a transmission-side mobile unit and a reception-side mobile unit, the server apparatus comprising: data list receiving means for receiving a data list from the transmission-side mobile unit; check list receiving means for receiving a check list for determining data compatibility in the reception-side mobile unit, from the reception-side mobile unit; data selecting means for collating the data list received by the data list receiving means, with the checklist received by the checklist receiving means, to select data with data compatibility in the reception-side mobile unit; data receiving means for receiving the data selected by the data selecting means, from the transmission-side mobile unit; data extracting means for extracting data to be transmitted to the reception-side mobile unit, out of the data received by the data receiving means; and data transmitting means for transmitting the data extracted by the data extracting means, to the reception-side mobile unit.

A reception-side mobile unit according to the present invention is a reception-side mobile unit configured to implement transmission and reception of data to and from the aforementioned server apparatus, the reception-side mobile unit comprising: check list storage means for storing a check list; and list transmitting means for transmitting the check list stored in the check list storage means, to the server apparatus.

The present invention may also be applied to construction and operation of an information communication system comprising a transmission-side mobile unit, a reception-side mobile unit, and the foregoing server apparatus, and configured to implement transmission and reception of data between the transmission-side mobile unit and the server apparatus and between the server apparatus and the reception-side mobile unit.

An information communication method according to the present invention is an information communication method in which a server apparatus implements transmission and reception of data to and from a transmission-side mobile unit and a reception-side mobile unit, the information communication method comprising: a data list receiving step of receiving a data list from the transmission-side mobile unit; a check list receiving step of receiving a check list for determining data compatibility in the reception-side mobile unit, from the reception-side mobile unit; a data selecting step of collating the data list received in the data list receiving step, with the check list received in the check list receiving step, to select data with data compatibility in the reception-side mobile unit; a data receiving step of receiving the data selected in the data selecting step, from the transmission-side mobile unit; a data extracting step of extracting data to be transmitted to the reception-side mobile unit, out of the data received in the data receiving step; and a data transmitting step of transmitting the data extracted in the data extracting step, to the reception-side mobile unit.

According to these aspects of the invention, the reception-side mobile unit performs the storage of the check list for determining the data compatibility in the reception-side mobile unit. Accordingly, this configuration is suitable for the case where there exist a plurality of reception-side mobile units assumed as data destinations, as compared with the case where the server apparatus performs the storage. Namely, in the case where there exist a plurality of reception-side mobile units assumed as data destinations, the server apparatus needs to store a plurality of check lists according to the models and operating systems of the respective reception-side mobile units, which is not preferred in terms of search efficiency and transfer time. Therefore, such inconvenience can be overcome by the configuration wherein the plurality of reception-side mobile units store the check lists according to the respective reception-side mobile units and transmit the check lists to the server apparatus according to need.

Preferably, the server apparatus according to the present invention is configured to further comprise data converting means for converting or processing the data received by the data receiving means, into data with data compatibility in the reception-side mobile unit, and so that the data extracting means extracts the data to be transmitted to the reception-side mobile unit, out of the data into which the data converting means converted or processed the received data.

Preferably, the information communication method according to the present invention is configured so as to further comprise a data converting step wherein the server apparatus converts or processes the data received in the data receiving step, into data with data compatibility in the reception-side mobile unit, and so that in the data extracting step the server apparatus extracts the data to be transmitted to the reception-side mobile unit, out of the data into which the received data was converted or processed in the data converting step.

According to these aspects of the invention, the server apparatus converts or processes the data transmitted from the transmission-side mobile unit to the server apparatus, according to need. Namely, even if the data stored in the transmission-side mobile unit is incompatible with the reception-side mobile unit, the server apparatus can convert or process the data into the data compatible with the reception-side mobile unit. This permits more data to be transferred to the reception-side mobile unit. As a result, the data transfer efficiency is increased.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a flowchart showing the processing in the information communication system.

FIG. 4 is a diagram showing an example of the common data list.

FIG. 7 is a diagram showing an example of the application-related data list.

FIG. 8 is a diagram showing an example of the source data list.

FIG. 9 is a diagram showing an example of the common check list.

FIG. 14 is a diagram showing an example of the data compatibility check result.

FIG. 16 is a diagram showing an example of the request list.

FIG. 22 is a system configuration diagram of the information communication system in the fourth embodiment.

DESCRIPTION OF THE PREFERRED EMBODIMENTS

First Embodiment

The information communication system in the first embodiment of the present invention will be described below. The information communication system includes the transmission-side mobile unit and the reception-side mobile unit according to the present invention.

Figure 11:
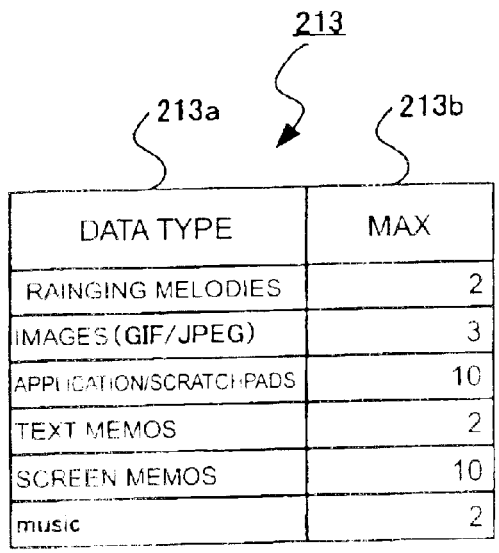
FIG. 11 is a diagram showing an example of the file capacity check list.

First, the configuration of the information communication system will be described. FIG. 11 is a hardware configuration diagram of cellular phone 10 which is a component of the information communication system. The cellular phone 10 is comprised of a CPU 10$a$, a memory 10$b$ such as a semiconductor memory, a communication device 10$c$ configured to perform transmission and reception of data to and from cellular phone 20, an input device 10$d$ such as operation buttons, a display device 10$e$ such as LCD (Liquid Crystal Display) or EL (Electro Luminescence), and a sound processing device 10$f$ such as a microphone, a speaker, and the like. Here the CPU 10$a$, memory 10$b$, communication device 10$c$, input device 10$d$, display device 10$e$, and sound processing device 10$f$ each are connected through bus 10$g$ so as to be able to communicate with each other.

Since the hardware configuration of the cellular phone 20 also being a component of the information communication system is much the same as that of the cellular phone 10, the components of the cellular phone 20 will be denoted by identical series of reference symbols as those of the cellular phone 10, without providing the illustration and detailed description thereof. Namely, the cellular phone 20 is comprised of a CPU 20$a$, a memory 20$b$, a communication device 20$c$, an input device 20$d$, a display device 20$e$, and a sound processing device 20$f$. The CPU 20$a$, memory 20$b$, communication device 20$c$, input device 20$d$, display device 20$e$, and sound processing device 20$f$ each are connected through bus 20$g$ so as to be able to communicate with each other.

The transfer of content data between the cellular phone 10 and the cellular phone 20 can be, for example, any transfer utilizing radio communication such as UART (Universal Asynchronous Receiver Transmitter), IrDA (Infrared Data Association), Bluetooth (registered trademark), and so on, and can be any other means including forwarding via server apparatus, transfer through a recording medium such as UIM or the like, and so on.

Figure 1:
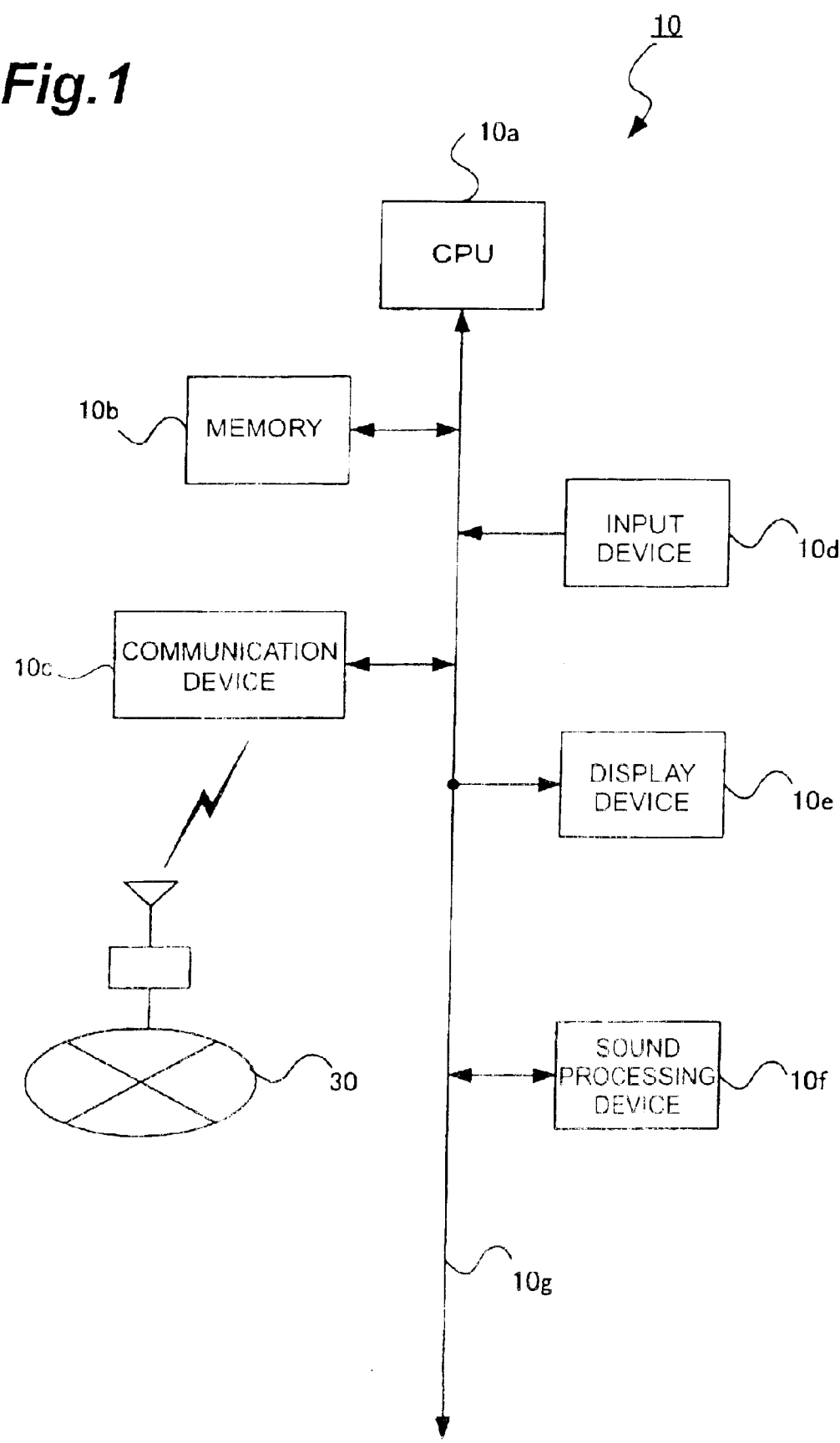
FIG. 1 is a hardware configuration diagram of the cellular phone.
Figure 2:
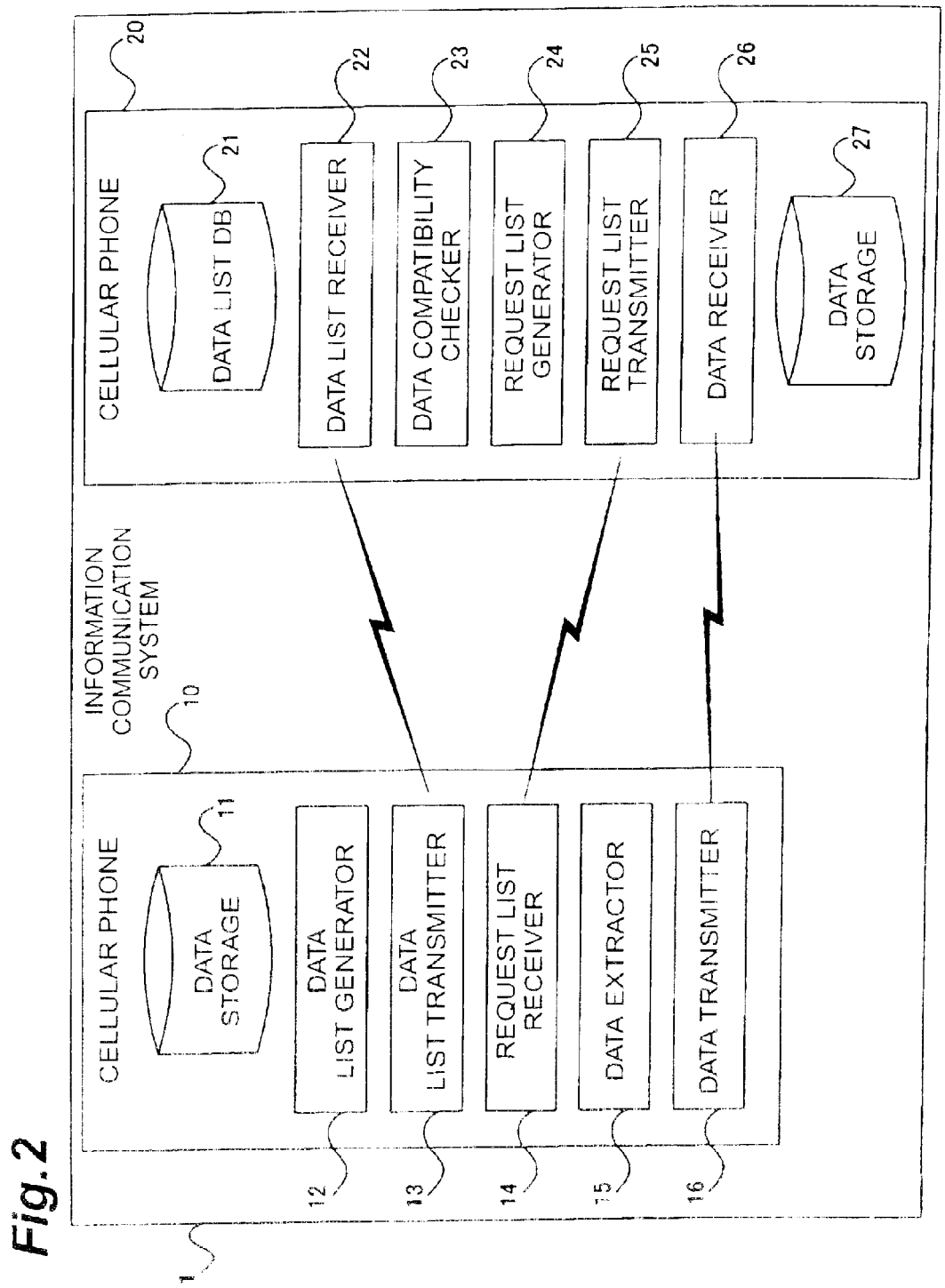
FIG. 2 is a system configuration diagram of the information communication system in the first embodiment.

FIG. 2 is a system configuration diagram of the information communication system 1. The cellular phone 10 forming the information communication system 1 is a transmission-side mobile unit to transmit content data to the cellular phone 20. The cellular phone 10 is functionally comprised of a data storage 11, a data list generator 12, a data list transmitter 13, a request list receiver 14, a data extractor 15, and a data transmitter 16. Here the data storage 11 corresponds to the memory 10b shown in FIG. 1. The data list generator 12, data list transmitter 13, request list receiver 14, data extractor 15, and data transmitter 16 are implemented when the CPU 10a executes software stored in the memory 10b shown in FIG. 1. Each of the components will be described below in detail.

The data storage 11 (corresponding to the data storage means) stores content data as candidates for transmission to the cellular phone 20. It was described for convenience sake of description that the content data itself was stored in the data storage 11, but it is also possible to employ a configuration wherein the data storage 11 stores pointers indicating storage locations of the content data and the content data itself is stored in the other storage locations indicated by the pointers.

The data list generator 12 generates a list of the content data stored in the data storage 11, as a data list.

The data list transmitter 13 (corresponding to the list transmitting means) transmits the data list generated by the data list generator 12, to the cellular phone 20.

The request list receiver 14 receives a request list transmitted from a request list transmitter 25 of the cellular phone 20 described hereinafter.

The data extractor 15 (corresponding to the data extracting means) selects and extracts content data to be transmitted to the cellular phone 20, out of the content data stored in the data storage 11, with reference to the request list received by the request list receiver 14.

The data transmitter 16 (corresponding to the data transmitting means) transmits the content data extracted by the data extractor 15, to the cellular phone 20.

The cellular phone 20 is a reception-side mobile unit which receives the content data transmitted from the cellular phone 10. The cellular phone 20 is functionally comprised of a check list DB 21, a data list receiver 22, a data compatibility checker 23, a request list generator 24, a request list transmitter 25, a data receiver 26, and a data storage 27. Here the check list DB 21 and data storage 27 correspond to the memory 20b. The data list receiver 22, data compatibility checker 23, request list generator 24, request list transmitter 25, and data receiver 26 are implemented when the CPU 20a executes software stored in the memory 20b. Each of the components will be described below in detail.

The check list DB 21 (corresponding to the list storage means) stores a list of content data compatible with the cellular phone 10 in the cellular phone 20, as a check list.

The data list receiver 22 (corresponding to the list receiving means) receives the data list transmitted from the data list transmitter 13 of the cellular phone 10.

The data compatibility checker 23 collates the data list received by the data list receiver 22, with the check list acquired from the check list DB 21 to determine whether the content data listed in the data list is compatible with the cellular phone 20.

The request list generator 24 (corresponding to the data selecting means) selects content data with data compatibility on the basis of the result of the determination on the data compatibility by the data compatibility checker 23, and generates a request list in which the selected content data is recorded.

The request list transmitter 25 transmits the request list generated by the request list generator 24, to the cellular phone 10.

The data receiver 26 (corresponding to the data receiving means) receives the content data transmitted from the data transmitter 16 of the cellular phone 10.

The data storage 27 stores the content data received by the data receiver 26.

The following will describe the operation of the information communication system in the present embodiment and also describe an information communication method according to the present invention. FIG. 3 is a flowchart showing the operation of the information communication system 1. In the information communication system 1, for transferring content data from the cellular phone 10 to the cellular phone 20, the data list generator 12 first generates the data list of the content data stored in the data storage 11 (S1).

FIG. 4 is a diagram showing an example of the data list generated in S1. As shown in FIG. 4, the data list 121 generated by the data list generator 12 has an ID storage area 121a, a file name storage area 121b, a data type storage area 121c, a data format storage area 121d, an acquisition/update date storage area 121e, a data size storage area 121f, and an option data list number storage area 121g.

In the ID storage area 121a, identification information (e.g., "1," "2," . . . , "36") uniquely allocated to all the content data stored in the data storage 11 is stored under "ID," in order to identify the content data.

In the file name storage area 121b, names of files (e.g., "A1.xxx," "A2.xxx," . . . , "D18.xxx") corresponding to the respective content data stored in the data storage 11 are stored under "file name."

In the data type storage area 121c, character data (e.g., "mail," "schedule," . . . , "music") indicating types of the respective content data stored in the data storage 11 is stored under "data type."

In the data format storage area 121d, output formats (e.g., "standardformat," "MFI," . . . , "WMA") of the respective content data stored in the data storage 11 are stored under "data format."

In the acquisition/update date storage area 121e, data indicating acquisition dates of the respective content data stored in the data storage 11 (e.g., "2002/1/10," "2002/1/11," . . . , "2002/2/13") is stored. If the content data is updated after acquired, data indicating an update date is stored. These data is stored under "acquisition/update date."

In the data size storage area 121f, data volumes of the respective content data (e.g., "10 KB," "1 KB," . . . , "20 KB") stored in the data storage 11 are stored under "data size."

In the option data list number storage area 121g, numbers of data lists (e.g., "0," "1," "2," and "3") in which more detailed information is stored, corresponding to predetermined types of content data, are stored under "option data list number." The content data without any more detailed information to be referenced, except for the data recorded in the data list 121, is provided with the mark "−" indicating that fact, in the option data list number storage area 121g.

Figure 5:
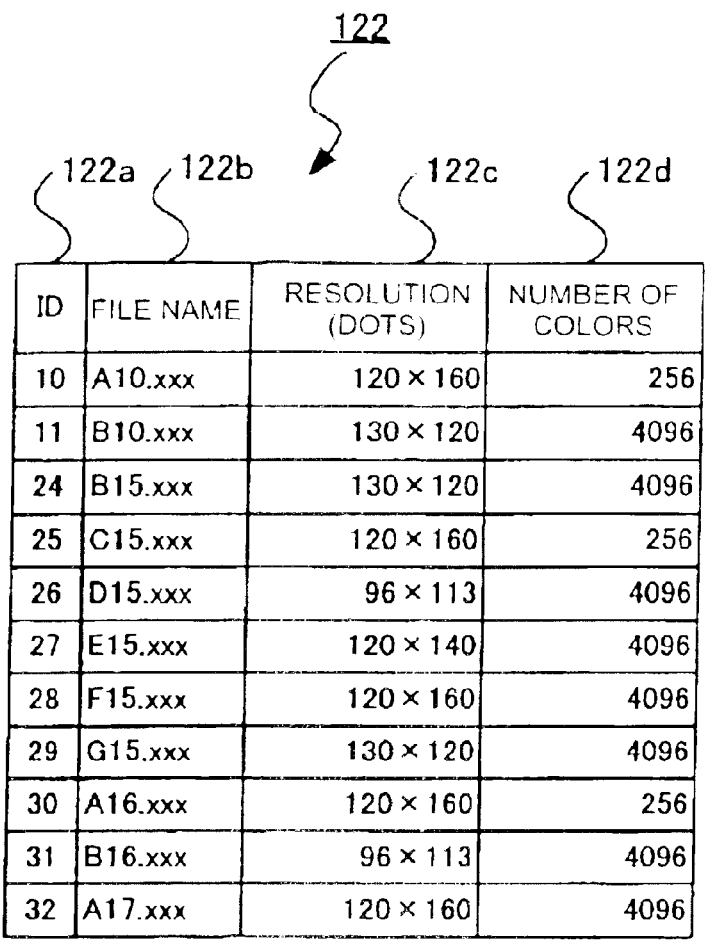
FIG. 5 is a diagram showing an example of the image-related data list.

FIG. 5 is a diagram showing an example of the option data list which stores data to be referenced when the type of content data is associated with an image. Here the option data lists include an image-related data list, a music-related data list, and an application-related data list. The image-related data list is a data list as a record of information related to image data, the music-related data list a data list as a record of information related to music data, and the application-related data list a data list as a record of information about application programs (e.g., information indicating operating environments such as version information, API (Application Program Interface), etc.). As shown in FIG. 5, the image-related data list 122 has an ID storage area 122a, a file name storage area 122b, a resolution storage area 122c, and a number-of-colors storage area 122d.

In the ID storage area 122a, identification information (e.g., "10," "11," . . . , "32") uniquely allocated to the respective content data stored in the data storage 11 is stored under "ID," in order to identify the content data.

In the file name storage area 122b, names of files (e.g., "A10.xxx," "B10.xxx," . . . , "A17.xxx") corresponding to the respective content data stored in the data storage 11 are stored under "file name."

In the resolution storage area 122c, numerical data (e.g., "120×160," "130×120," . . . , "120×160") indicating the resolution (in units of dots) for display of the content data corresponding to each ID stored in the ID storage area 122a is stored under "resolution."

In the number-of-colors storage area 122d, numerical data (e.g., "256," "4096," . . . , "4096") indicating the number of colors for display of the content data corresponding to each ID stored in the ID storage area 122a is stored under "number of colors."

Figure 6:
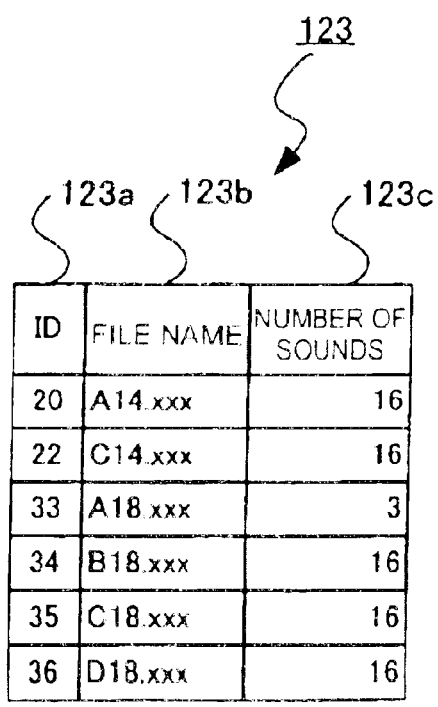
FIG. 6 is a diagram showing an example of the music-related data list.

FIG. 6 is a diagram showing an example of the option data list which stores data to be referenced when the type of content data is related to music. As shown in FIG. 6, the music-related data list 123 has an ID storage area 123a, a file name storage area 123b, and a number-of-sounds storage area 123c.

In the ID storage area 123a, identification information (e.g., "20," "22," . . . , "36") uniquely allocated to the respective content data stored in the data storage 11 is stored under "ID," in order to identify the content data.

In the file name storage area 123b, names of files (e.g., "A14.xxx," "C14.xxx," . . . "D18.xxx") corresponding to the respective content data stored in the data storage 11 are stored under "file name."

In the number-of-sounds storage area 123c, numerical data (e.g., "16," "16," "3," . . . ) indicating the number of chords for reproduction of the content data corresponding to each ID stored in the ID storage area 123a is stored under "number of sound."

Furthermore, FIG. 7 is a diagram showing an example of the option data list which stores data to be referenced when the type of content data is related to a Java (registered trademark) application. As shown in FIG. 7, the application-related data list 124 has an ID storage area 124a, a file name storage area 124b, and a file attribute storage area 124c.

In the ID storage area 124a, identification information (e.g., 32) uniquely allocated to each content data stored in the data storage 11 is stored under "ID," in order to identify the content data.

In the file name storage area 124b, a name of a file (e.g., A17.xxx) corresponding to each content data stored in the data storage 11 is stored under "file name."

In the file attribute storage area 124c, information about attributes of the content data corresponding to the ID stored in the ID storage area 124a is stored under "ADF (Attribute Definition File) file."

FIG. 8 is a diagram showing an example of the data list as a record of information about the cellular phone 10 (hereinafter referred to as "source data list"), stored in the data storage 11. In the description hereinafter, the common data list, the option data lists, and the source data list will be simply referred to together as "data list." As shown in FIG. 8, the source data list 125 has a resolution storage area 125a, a number-of-colors storage area 125b, a number-of-sounds storage area 125c, and an attachment restriction storage area 125d.

In the resolution storage area 125a, numerical data (e.g., 120×160 dots or less) indicating the resolution in which the display device 10c of the cellular phone 10 can display the content data is stored under "resolution."

In the number-of-colors storage area 125b, numerical data (e.g., 65,536 colors or less) indicating the number of colors in which the display device 10e of the cellular phone 10 can display the content data is stored under "number of colors."

In the number-of-sounds storage area 125c, numerical data (e.g., 16 chords or less) indicating the number of chords with which the sound processing device 10f of the cellular phone 10 can reproduce the content data is stored under "number of sounds."

In the attachment restriction storage area 125d, data indicating restrictions (e.g., reception: max.one, provided that up to 100 KB is allowed in addition to the main text) for the communication device 10c of the cellular phone 10 to transmit the content data as attachment data is stored under "attachment restrictions."

In S2, the data list transmitter 13 transmits the data list (consisting of the common data list, the option data lists, and the source data list) generated in S1, to the cellular phone 20.

In S3, the data list receiver 22 receives the data list transmitted by the data list transmitter 13.

In S4, it is determined whether the content data recorded in the data list received by the data list receiver 22 is compatible with the cellular phone 20, with reference to the check list stored in the check list DB 21.

FIG. 9 is a diagram showing an example of the check list to which reference is made in S4. As shown in FIG. 9, the common check list 211 has an ID storage area 211a, a data type storage area 211b, a data format storage area 211c, and a data size storage area 211d.

In the ID storage area 211a, identification information (e.g., "1," "2," . . . , "26") of records allocated to the respective content data different in at least one of the type, the data format, and the data size of content data is stored under "ID."

In the data type storage area 211b, character data (e.g., "mail," "schedule," . . . "music") indicating the types of the content data that can be transferred to the cellular phone 20 is stored under "data type."

In the data format storage area 211c, output formats (e.g., "standardformat," "AAC," . . . ,"ATRAC3") of the content data that can be transferred to the cellular phone 20 are stored under "data format."

In the data size storage area 211d, data volumes (e.g., "20 KB or less," "10 KB or less," . . . , "100 KB or less") of the content data that can be transferred to the cellular phone 20 are stored under "data size."

Figure 10:
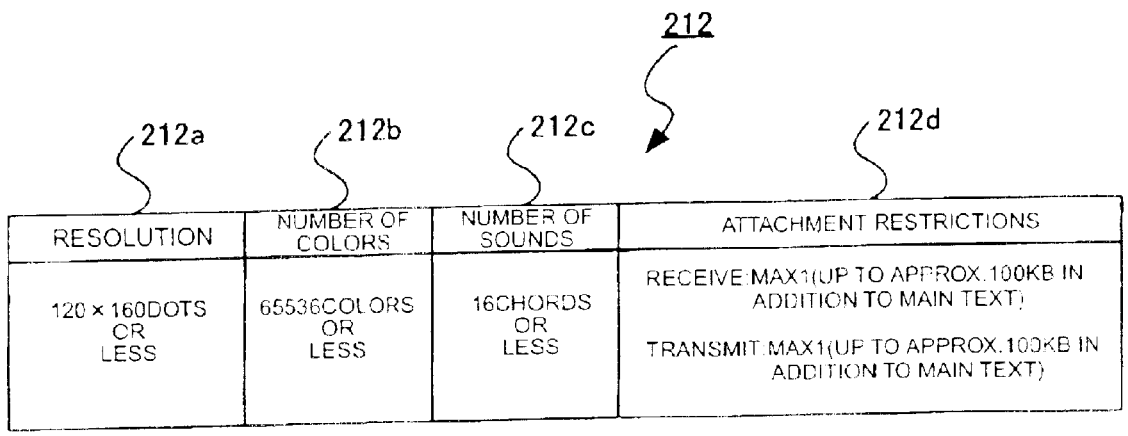
FIG. 10 is a diagram showing an example of the option check list.

FIG. 10 is a diagram showing an example of the check list stored in the check list DB 21 and including a record of the information about the cellular phone 20. As shown in FIG. 10, the option check list 212 has a resolution storage area 212a, a number-of-colors storage area 212b, a number-of-sounds storage area 212c, and an attachment restriction storage area 212d.

In the resolution storage area 212a, numerical data (e.g., 120×160 dots or less) indicating the resolution in which the display device 20e of the cellular phone 20 can display the content data is stored under "resolution."

In the number-of-colors storage area 212b, numerical data (e.g., 65536 colors or less) indicating the number of colors in which the display device 20e of the cellular phone 20 can display the content data is stored under "number of colors."

In the number-of-sounds storage area 212c, numerical data (e.g., 16 chords or less) indicating the number of chords with which the sound processing device 20f of the cellular phone 20 can reproduce the content data is stored under "number of sounds."

In the attachment restriction storage area 212d, data indicating restrictions (e.g., reception:max.one, provided that up to 100 KB is allowed in addition to the main text) for the communication device 20c of the cellular phone 20 to receive the content data as attachment data is stored under "attachment restrictions."

FIG. 11 is a diagram showing an example of a file capacity check list of the cellular phone 20, stored in the check list DB 21. As shown in FIG. 11, the file capacity check list 213 has a data type storage area 213a and a maximum number storage area 213b.

In the data type storage area 213a, character data (e.g., "ringing melodies," "images," . . . , "music") indicating the types of the content data transferable to the cellular phone 20 is stored under "data type."

In the maximum number storage area 213b, numerical data (e.g., "2," "3," . . . , "2") indicating the maximum numbers of data that can be stored in the cellular phone 20, corresponding to the types of content data stored in the data type storage area 213a is stored under "maximum number." In the description hereinafter, the common check list, the option check list, and the file capacity check list will be simply referred to together as "check list."

Figure 12:
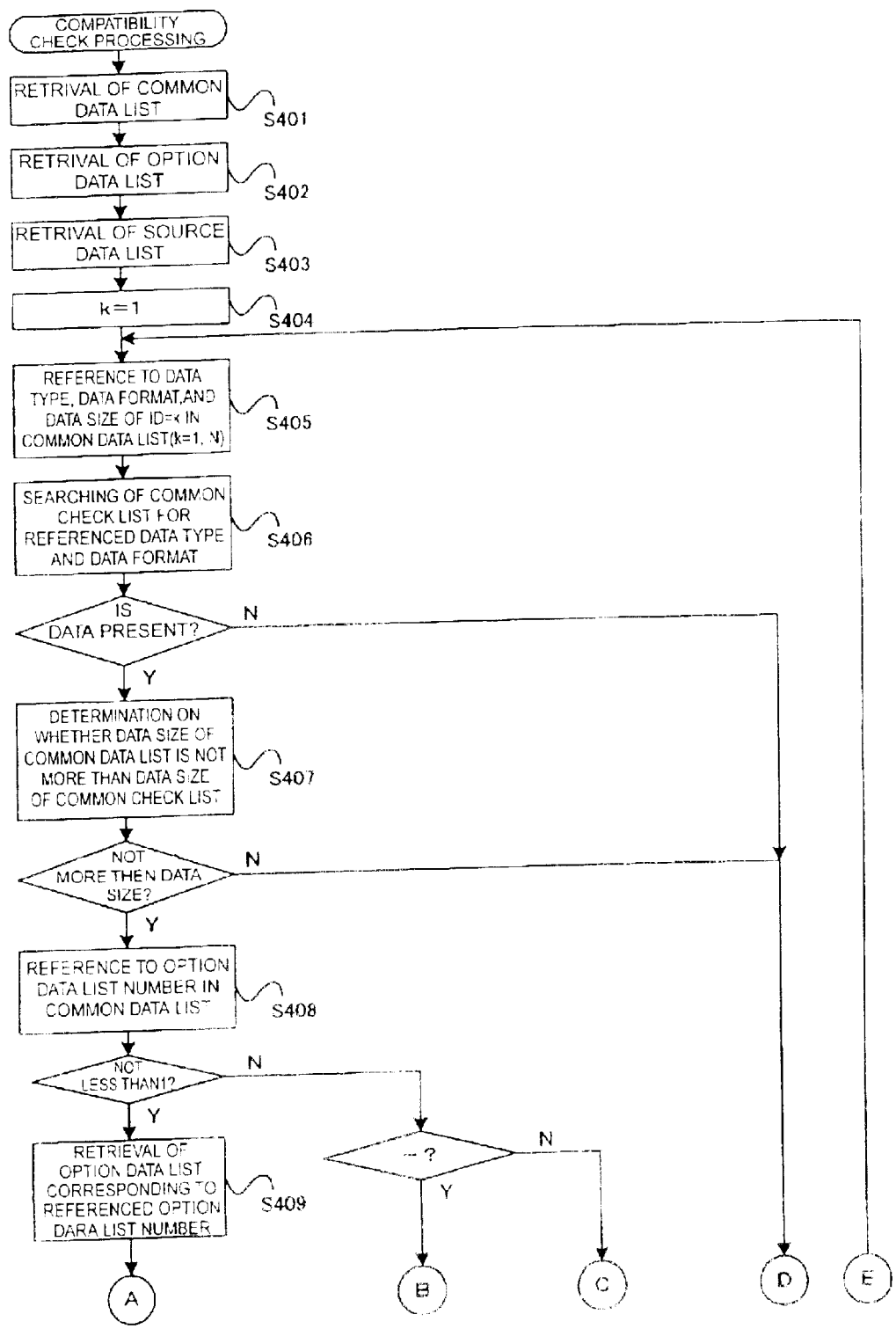
FIG. 12 is a flowchart showing the first half of the compatibility check processing.
Figure 13:
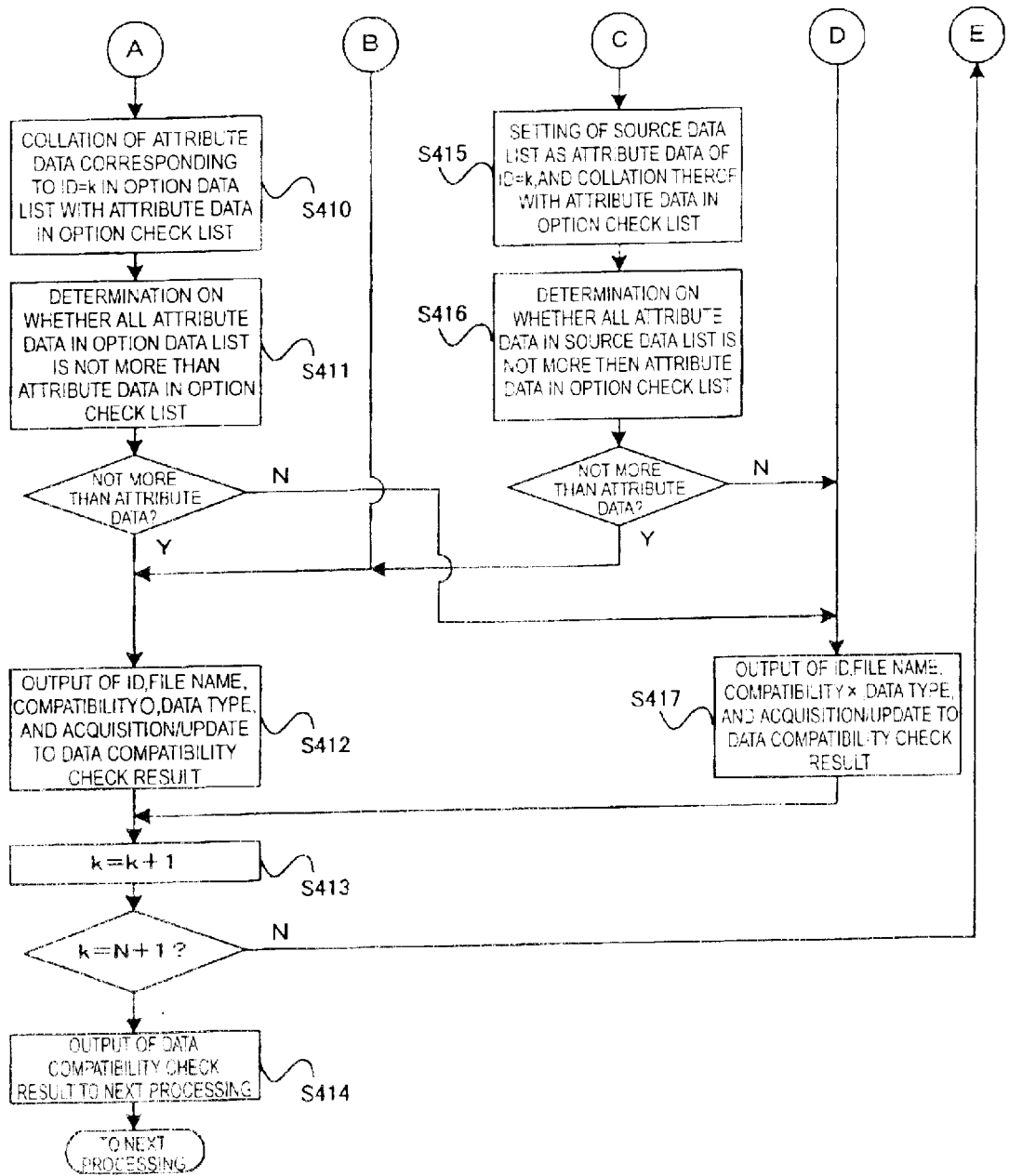
FIG. 13 is a flowchart showing the second half of the compatibility check processing.

The compatibility check processing executed by the data compatibility checker 23 in S4 will be described below in detail with reference to FIG. 12 and FIG. 13. First, the data compatibility checker 23 retrieves the data list received by the data list receiver 22, into the memory. Namely, the common data list is retrieved into the memory in S401, the option data lists in S402, and the source data list in S403.

In next S404, "k=1" is set as an initial value of a counter for records as targets for the compatibility check. In S405, reference is made to the data type, the data format, and the data size of the content data corresponding to ID=k in the common data list. At this time, reference is made to the common data list, to set k=N as a maximum of k.

In S406, a search is conducted through the data recorded in the common check list to determine whether the data type and data format included in the common data list are present in the common check list.

If in S406 the content data of the aforementioned data type and data format is present in the common check list, reference is made to the data size of the content data in the common data list to determine whether the data size is not more than the predetermined data size recorded in the common check list (S407).

If in S407 the data size is not more than the predetermined data size recorded in the common check list, reference is made to the option data list number of the content data in the common data list to determine whether the option data list number is not less than 1 (S408).

If the option data list number is not less than 1 herein, the option data list corresponding to the option data list number referenced in S408 is retrieved into the memory (S409) Subsequently, the attribute data corresponding to ID=k recorded in the option data list thus retrieved into the memory is collated with the attribute data recorded in the option check list (S410).

When the result of the collation is that all the attribute data corresponding to ID=k recorded in the option data list is not more than the attribute data recorded in the option check list, it is determined that the content data corresponding to ID=k is within the predetermined restriction range (S411).

When it is determined herein that the content data is within the predetermined restriction range, ID=k, file name, compatibility "o", data type, and acquisition/update date are outputted to the data compatibility check result (S412)

Subsequently, k+1 is set in the counter k for the records as targets for the compatibility check (S413) and whether k=N+1 is determined. When the result of the determination is that k=N+1, the flow transfers to S414 described later. If k is not equal to N+1 on the other hand, the flow returns to S405 to repeatedly execute the sequential processing from S405 to S413. This results in executing the compatibility check for all the content data included in the data list. After the compatibility check is finished for all the content data included in the data list, the data compatibility check result is outputted (S414).

When the result of the determination in S408 is that the option data list number is "-," the flow transfers to the processing in and after S412 while skipping each of the processes of S409 to S411. When the result of the determination in S408 is that the option data list number is "0," the source data list is regarded as the attribute data corresponding to ID=k and the attribute data is collated with the attribute data recorded in the option check list (S415).

When the result of the collation is that the source data list regarded as the attribute data corresponding to ID=k is not more than the attribute data recorded in the option check list, it is determined that the content data corresponding to ID=k is within the predetermined restriction range (S416). When it is determined herein that the content data is within the predetermined restriction range, the flow transfers to aforementioned S412. Namely, ID=k, file name, compatibility "o", data type, and acquisition/update date are outputted to the data compatibility check result.

When in S406 the content data of the above data type and data format is absent in the common check list, it is determined that the content data as a target for the compatibility check cannot be transferred to the cellular phone 20, and ID=k, file name, compatibility "x", data type, and acquisition/update date are outputted to the data compatibility check result (S417).

Similarly, when in S407 the above data size exceeds the predetermined data size recorded in the common check list, it is determined that the content data as a target for the compatibility check cannot be transferred to the cellular phone 20, and ID=k, file name, compatibility "x", data type, and acquisition/update date are outputted to the data compatibility check result.

Furthermore, when in S411 and S416 it is determined that the content data is not within the predetermined restriction range, the content data as a target for the compatibility check cannot be transferred to the cellular phone 20, and ID=k, file name, compatibility "x", data type, and acquisition/update date are outputted to the data compatibility check result. After completion of S417, the flow transfers to the processing in and after S413.

FIG. 14 is a diagram showing an example of the data compatibility check result outputted in S414. As shown in FIG. 14, the data compatibility check result 231 has an ID output area 231a, a file name output area 231b, a compatibility result output area 231c, a data format output area 231d, and an acquisition/update date output area 231e.

The ID output area 231a contains output of identification information (e.g., "1," "2," . . . , "36") uniquely allocated to all the content data recorded in the data list, under "ID," in order to identify the content data after the compatibility check.

The file name output area 231b contains output of names of files (e.g., "A1.xxx," "A2.xxx," . . . , "D18.xxx") corresponding to the respective content data recorded in the data list, under "file name."

The compatibility result output area 231c contains output of symbols (e.g., "o," and "x") indicating the compatibility check result outputted in aforementioned S412 and S417, under "compatibility result."

The data format output area 231d contains data formats (e.g., "standard format," "MFI," ..., "WMA") for output of the above respective content data in the cellular phone 20, under "data format."

The acquisition/update date output area 231e contains output of data indicating the dates of acquisition of the above respective content data (e.g., "2002/1/10," "2002/1/11," ..., "2002/2/13"). If the content data is updated after acquired, the area 231e contains output of data indicating the date of the update. These data is stored as output under "acquisition/update date."

Figure 15:
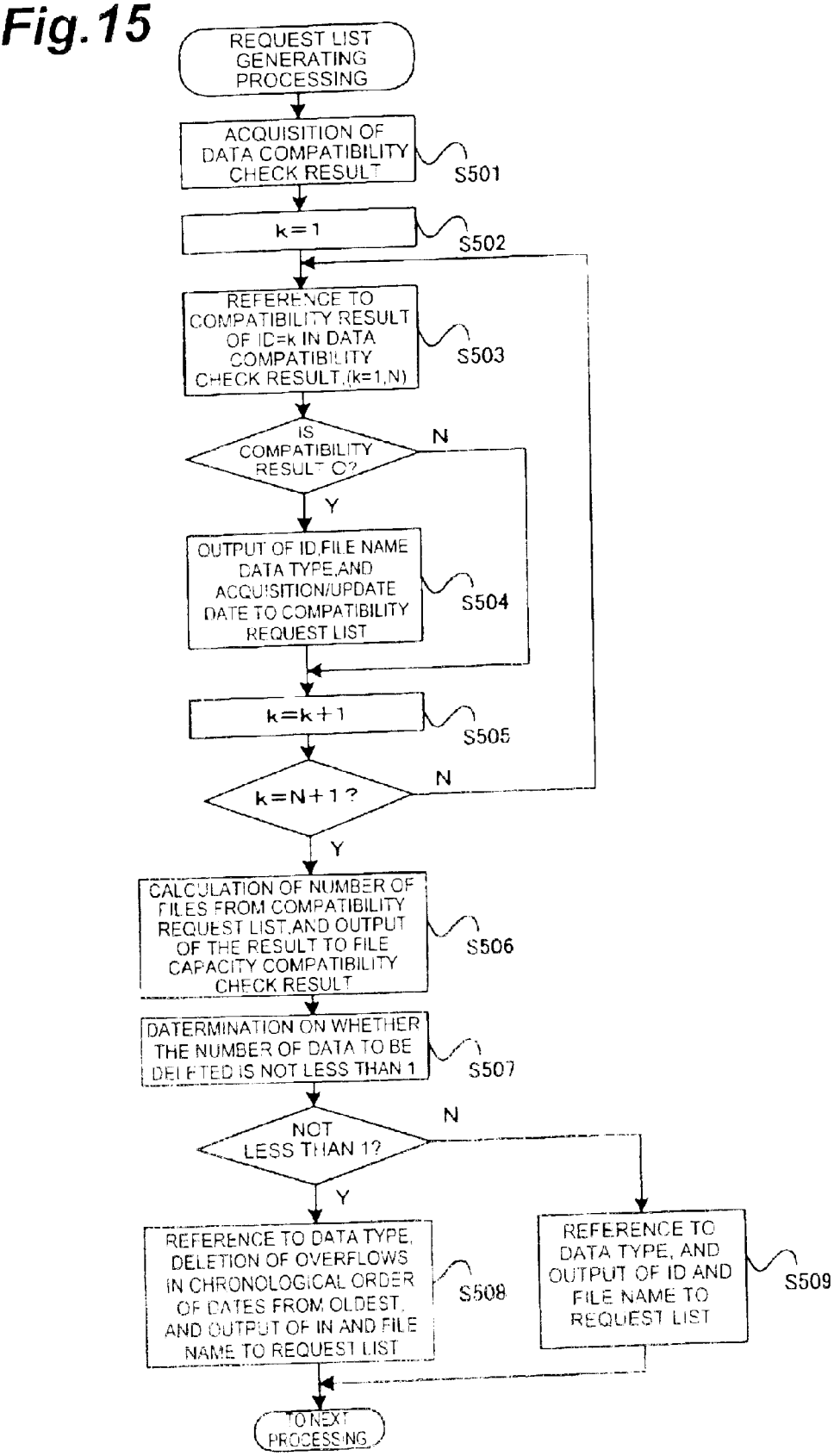
FIG. 15 is a flowchart showing the request list generating processing.

In subsequent S5, the request list generator 24 generates the request list as a record of a list of the content data that the cellular phone 20 requests the cellular phone 10 to transmit. The request list generating processing will be described below in detail with reference to FIG. 15.

In first S501, the request list generator 24 acquires the data compatibility check result outputted from the data compatibility checker 23. In next S502, "k=1" is set as an initial value of a counter for records used in the generation of the request list. Then reference is made to the compatibility check result of the content data corresponding to ID=k, in the data compatibility check result. At this time, reference is made to the data compatibility check result to set k=N as a maximum of k (S503).

When the result of the reference in S503 is that the compatibility check result is "o," each data of corresponding ID=k, file name, data type, and acquisition/update date is outputted to the compatibility request list (S504). Subsequently, k+1 is set in the counter k for the records used in the generation of the request list (S505), and it is determined whether k=N+1. When the result of the determination is that k=N+1, the flow proceeds to S506 described later. If k is not equal to N+1 on the other hand, the flow returns to S503 to repeatedly execute the sequential processing from S503 to S505. This results in listing all the content data judged as compatible with the cellular phone 20, in the compatibility request list.

When the result of the reference in S503 is that the compatibility check result is "x," the flow proceeds to the processing in and after S505 while skipping the process of S504. Therefore, as to the content data judged as incompatible with the cellular phone 20, each data of corresponding ID=k, file name, data type, and acquisition/update date is not outputted to the compatibility request list.

S506 is to calculate the number of files corresponding to the content data outputted into the compatibility request list, and to output the result of the calculation to the file capacity compatibility check result. The calculation result outputted at this time is total values in the respective types of content data.

FIG. 16 is a diagram showing an example of the request list outputted on the occasion of outputting the compatibility request list. As shown in FIG. 16, the request list 241 has an ID output area 241a, a file name output area 241b, a data type output area 241c, and an acquisition/update date output area 241d.

The ID output area 241a contains output of identification information (e.g., "1," "2," ..., "36") uniquely allocated to the respective content data judged as compatible with the cellular phone 20, under "ID," in order to identify the content data.

The file name output area 241b contains output of names of files (e.g., "A1.xxx," "A2.xxx," ..., "D18.xxx") corresponding to the content data judged as compatible with the cellular phone 20, under "file name."

The data type output area 241c contains output of data types (e.g., "mail," "schedule," ..., "music") of the content data judged as compatible with the cellular phone 20, under "data type."

The acquisition/update date output area 241d contains output of data indicating dates of acquisition of the above respective content data (e.g., "2002/1/10," "2002/1/11," ..., "2002/2/13"). If the content data is updated after acquired, the area 241d contains output of data indicating the date of the update. These data is stored as output under "acquisition/update date."

Figure 17:
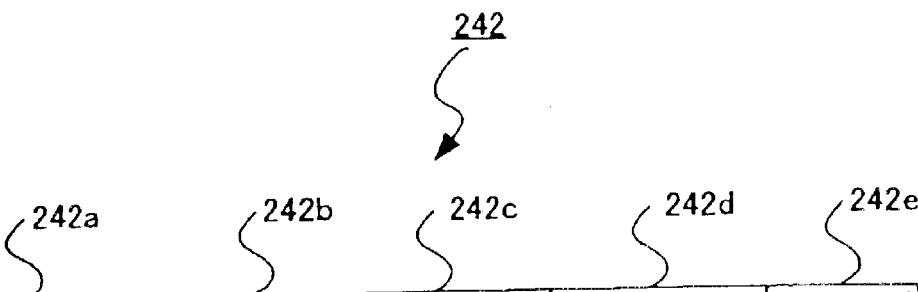
FIG. 17 is a diagram showing an example of the file capacity compatibility check result.

FIG. 17 is a diagram showing an example of the file capacity compatibility check result outputted with reference to the request list 241. As shown in FIG. 17, the file capacity compatibility check result 242 has a data type output area 242a, a maximum number output area 242b, a total data number output area 242c, a compatible data number output area 242d, and a deleted data number output area 242e.

The data type output area 242a contains output of data types (e.g., "ringing melodies," "images," ..., "music") of the respective content data judged as compatible with the cellular phone 20, under "data type."

The maximum number output area 242b contains output of data indicating the maximum numbers of content data transferable to the cellular phone 20 (e.g., "2," "3," ..., "2") in the respective data types.

The total data number output area 242c contains output of data indicating the numbers of content data included in the data list received by the data list receiver 22 (e.g., "3," "7," ..., "4") in the respective data types.

The compatible data number output area 242d contains output of data indicating the numbers of content data judged as compatible by the data compatibility checker 23 (e.g., "2," "4," ..., "3") out of the content data included in the data list received by the data list receiver 22, in the respective data types.

The deleted data number output area 242e contains output of the numbers of content data that should be deleted (e.g., "1") because of excess over the maximum numbers outputted into the maximum number output area 242b, in the respective data types. If there exists no content data to be deleted, "–" is outputted into the deleted data number output area 242e.

Returning to FIG. 15, S507 is to determine whether the number of content data outputted into the deleted data number output area 242e of the file capacity compatibility check result 242 is not less than 1. When the number of content data is not less than 1 herein, reference is made to the corresponding data type, and IDs and filenames of data within the number outputted into the maximum number output area 242b are outputted to the request list (S508). The deleted content data over the maximum is preferably determined in chronological order of the acquisition/update dates from the oldest. This results in preferentially transferring the content data with higher degree of user's necessity.

On the other hand, if the number of content data is less than 1, there is no content data exceeding the maximum; thus reference is made to the corresponding data type, and IDs and file names of data are outputted to the request list (S509).

Figure 18:
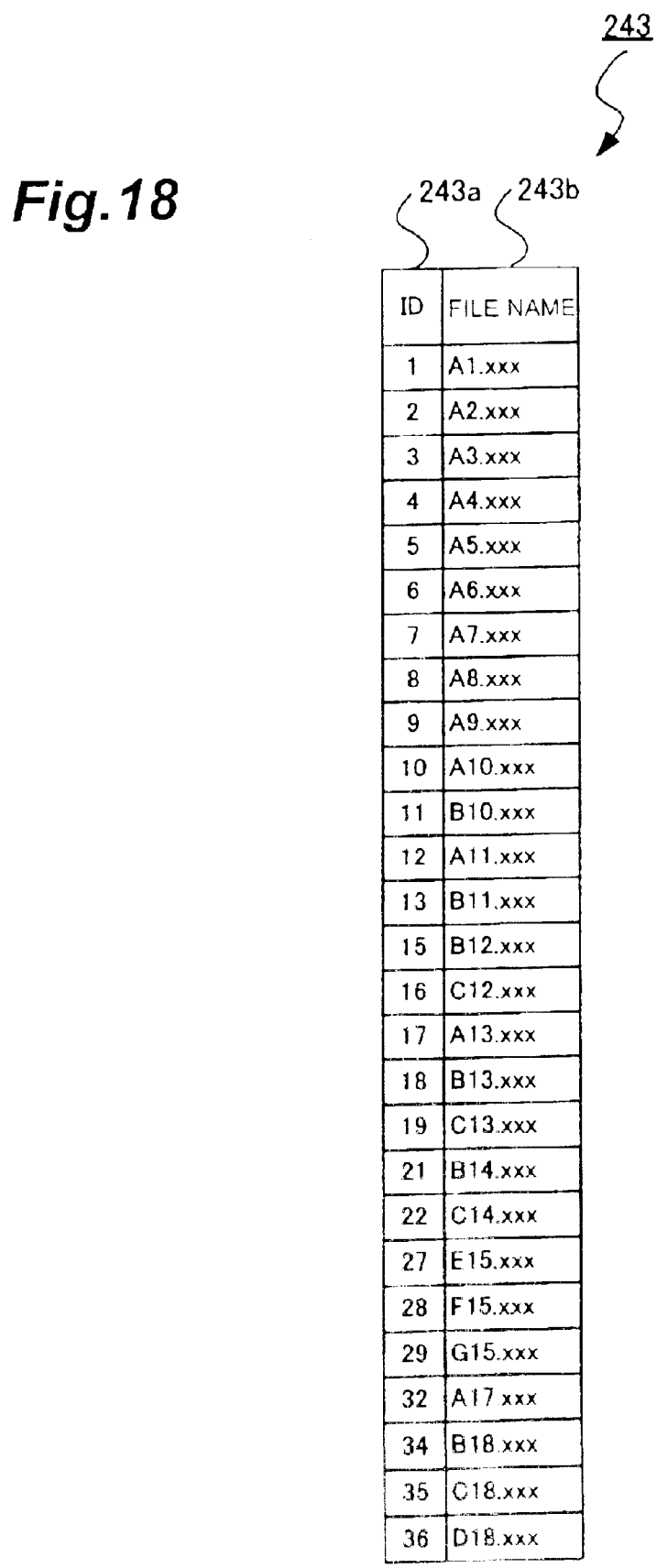
FIG. 18 is a diagram showing an example of the compatibility request list.

FIG. 18 is a diagram showing an example of the compatibility request list outputted in S506. As shown in FIG. 18, the compatibility request list 243 has an ID output area 243a and a file name output area 243b.

The ID output area 243a contains output of identification information (e.g., "1," "2," ..., "36") uniquely allocated to the respective content data, under "ID," in order to identify the content data transmitted from the cellular phone 10 to the cellular phone 20.

The file name output area 243b contains output of names of files (e.g., "A1.xxx," "A2.xxx," ..., "D18.xxx") corresponding to the content data transmitted from the cellular phone 10 to the cellular phone 20, under "filename."

Returning to FIG. 3, after completion of the request list generating processing, the request list transmitter 25 transmits the request list to the cellular phone 10 (S6) The request list transmitted is received by the request list receiver 14 of the cellular phone 10 (S7).

In S8, the data extractor 15 references to the received request list to extract the content data corresponding to the IDs and file names recorded in the request list, from the data storage 11. The data transmitter 16 transmits the thus extracted content data to the cellular phone 20 (S9).

The content data transmitted is received by the data receiver 26 of the cellular phone 20 (S10). Then the content data received is stored in the data storage 27 (S1).

As described above, for transferring the content data from the cellular phone 10 to the cellular phone 20, the data list of the content data stored in the data storage 11 of the cellular phone 10 is first transmitted from the cellular phone 10 to the cellular phone 20, prior to the transmission of the content data. Then the cellular phone 10 transmits the data selected by the cellular phone 20 on the basis of the compatibility of data, to the cellular phone 20. Accordingly, the volume of transmitted data is lower and the wireless resources or wired resources used can be reduced, as compared with the case where all the data stored in the cellular phone 10 is transmitted to the cellular phone 20. The content data incompatible between the cellular phone 10 and the cellular phone 20 is not stored in the cellular phone 20. As a result, it is feasible to implement efficient transfer of data between cellular phones.

Second Embodiment

Subsequently, the information communication system in the second embodiment of the present invention will be described. The information communication system in the present embodiment includes the transmission-side mobile unit, the reception-side mobile unit, and the server apparatus according to the present invention. The information communication system is different from that in the first embodiment in that the transmission and reception of data between the transmission-side mobile unit and the reception-side mobile unit is performed through the server apparatus such as a personal computer or the like.

First, the configuration of the information communication system in the present embodiment will be described. The information communication system is comprised of a cellular phone as a data source, a cellular phone as a data destination, and a server apparatus. The hardware configuration of each cellular phone is much the same as that of the cellular phones 10, 20 in the first embodiment described with FIG. 1.

Figure 19:
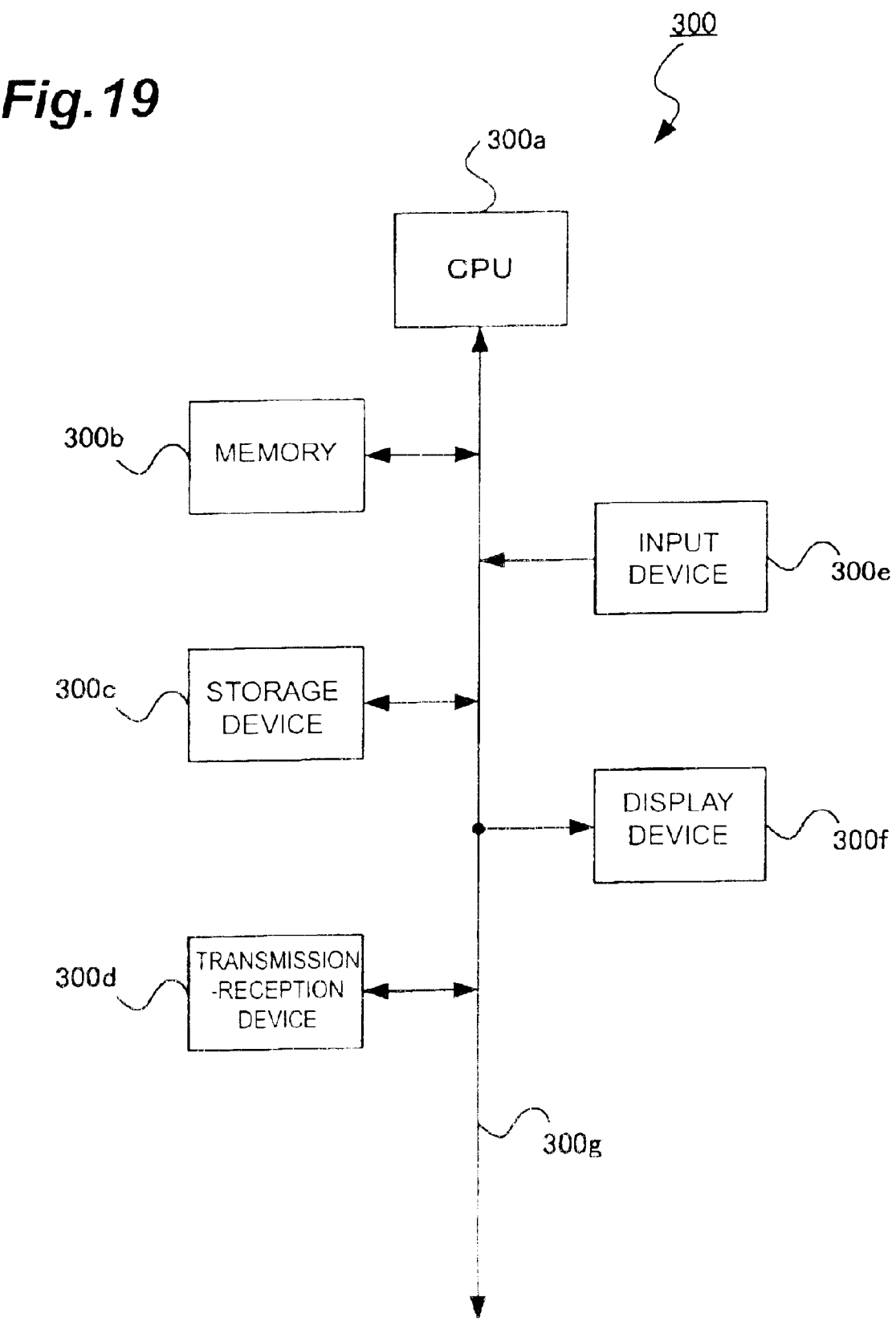
FIG. 19 is a hardware configuration diagram of the server apparatus in the embodiment from second to fourth.

FIG. 19 is a hardware configuration diagram of the server apparatus 300. The server apparatus 300 is comprised of a CPU 300a, a memory 300b such as a semiconductor memory, a storage device 300c such as a hard disk, a transmission-reception device 300d configured to perform transmission and reception of data to and from cellular phone 10 and cellular phone 20, an input device 300e such as a keyboard, a mouse, etc., and a display device 300f such as a display unit. Here the CPU 300a, memory 300b, communication device 300c, transmission-reception device 300d, input device 300e, and display device 300f each are connected through bus 300g so as to be able to communicate with each other.

Figure 20:
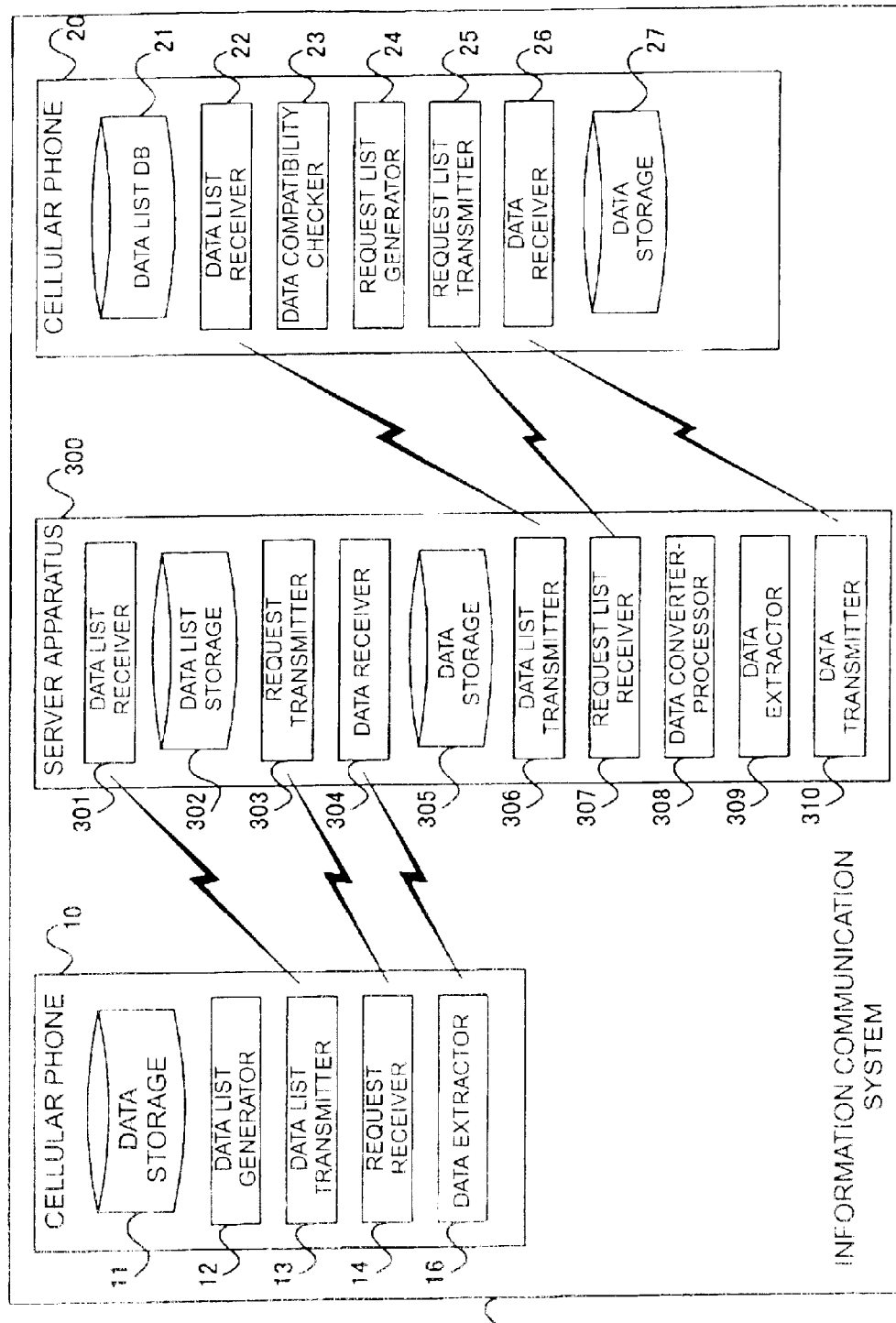
FIG. 20 is a system configuration diagram of the information communication system in the second embodiment.

FIG. 20 is a system configuration diagram of the information communication system 2 in the present embodiment. As shown in FIG. 20, the cellular phone 10 of the information communication system 2 has much the same fundamental configuration as the cellular phone 10 in the first embodiment, but is different in the functional configuration of the request receiver 14. Namely, the request receiver 14 does not receive the request list from the server apparatus 300, but receives a request for transmission of all the content data stored in the data storage 11. The cellular phone 20 has much the same fundamental structure as the cellular phone 20 detailed in the first embodiment.

The server apparatus 300 of the information communication system 2 is a server apparatus configured to relay the transfer of data from the cellular phone 10 to the cellular phone 20, and is functionally comprised of a data list receiver 301, a data list storage 302, a request transmitter 303, a data receiver 304, a data storage 305, a data list transmitter 306, a request list receiver 307, a data converter-processor 308, a data extractor 309, and a data transmitter 310. Each of the components will be described below in detail.

The data list receiver 301 receives the data list transmitted from the data list transmitter 13 of the cellular phone 10.

The data list storage 302 stores the data list received by the data list receiver 301.

The request transmitter 303 requests the cellular phone 10 to transmit all the content data stored in the data storage 11.

The data receiver 304 (corresponding to the data receiving means) receives the content data transmitted from the data transmitter 16 of the cellular phone 10.

The data storage 305 stores the content data received by the data receiver 304.

The data list transmitter 306 transmits the data list received by the data list receiver 301, to the cellular phone 20.

The request list receiver 307 receives the request list transmitted from the request list transmitter 25 of the cellular phone 20. The request list received includes at least the data compatibility check result 231 (cf. FIG. 14), the common check list 211 (cf. FIG. 9), and the file capacity compatibility check result 242 (cf. FIG. 17), which were detailed in the first embodiment.

The data converter-processor 308 (corresponding to the data converting means) refers to the data compatibility check result included in the request list received by the request list receiver 307, to convert and process the content data with the compatibility result of "x," into content data with data compatibility in the cellular phone 20.

The data extractor 309 (corresponding to the data extracting means) refers to the request list received by the request list receiver 307, to select and extract the content data with compatibility in the cellular phone 20, out of the content data stored in the data storage 305.

The data transmitter 310 (corresponding to the data transmitting means) transmits the content data extracted by the data extractor 309, to the cellular phone 20. The principal operations in the present embodiment including the compatibility check processing, the request list generating processing, the data extracting processing, etc. executed in the information communication system 2 are, though the subject is different, much the same as the respective processes of S4, S5, and S8, which were detailed in the first embodiment, and the illustration and detailed description thereof is omitted herein.

According to the information communication system 2 in the present embodiment, as described above, the various data is transmitted and received through the server apparatus 300, for transferring the content data from the cellular phone 10 to the cellular phone 20. Namely, the cellular phone 20 transmits to the server apparatus 300 the request list including the data compatibility check result 231, the data compatibility check list 211, and the file capacity compatibility check result 242.

The server apparatus 300 converts or processes the incompatible content data with reference to the received request list. When the total data volume comes to exceed the predetermined maximum as a result of the conversion or processing by augment of the compatible content data, the data volume is reduced by deleting the content data in chronological order of dates from the oldest, and the data thereafter is transmitted to the cellular phone 20. Since the server apparatus 300 converts or processes the content data, the content data that the cellular phone 10 cannot execute becomes executable in the cellular phone 20. This increases the data transfer efficiency in the information communication system. Besides, the cellular phone 20 can acquire the more newly data within the limits of storing.

Third Embodiment

Subsequently, the information communication system in the third embodiment of the present invention will be described. The information communication system in the present embodiment includes the transmission-side mobile unit, the reception-side mobile unit, and the server apparatus according to the present invention. The information communication system in the present embodiment is different from that in the second embodiment in that the server apparatus such as a personal computer performs the aforementioned compatibility check processing and request list generating processing.

First, the configuration of the information communication system in the present embodiment will be described. The information communication system in the present embodiment is comprised of a cellular phone as a data source, a cellular phone as a data destination, and a server apparatus. The hardware configuration of each cellular phone is much the same as the hardware configuration of the cellular phones 10, 20 in the first embodiment described with FIG. 1. The hardware configuration of the server apparatus is much the same as that of the server apparatus 300 in the second embodiment described with FIG. 19.

Figure 21:
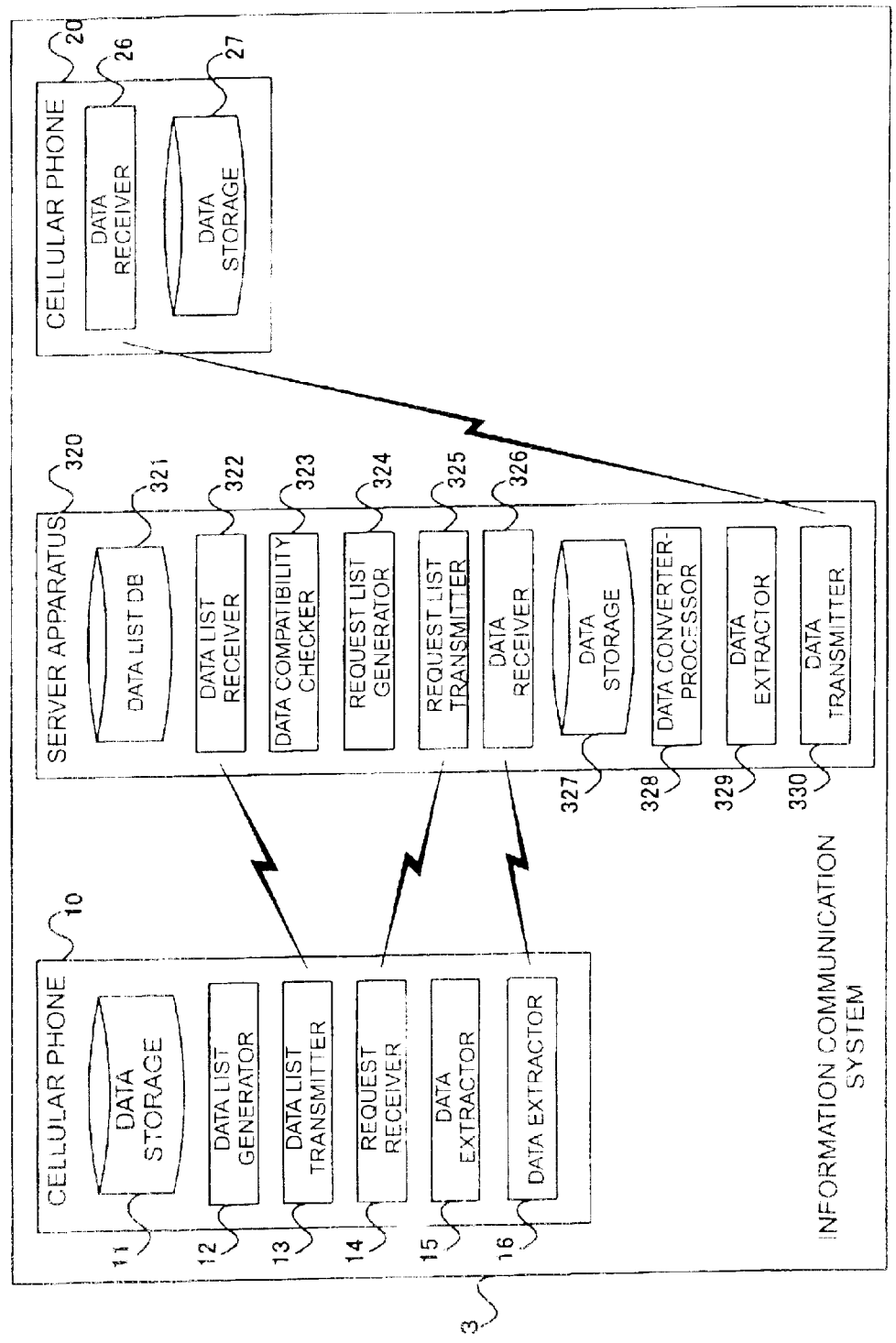
FIG. 21 is a system configuration diagram of the information communication system in the third embodiment.

FIG. 21 is a system configuration diagram of the information communication system 3 according to the present embodiment. The cellular phone 10 of the information communication system 3 has much the same fundamental configuration as the cellular phone 10 in the first embodiment. The cellular phone 20 in the present embodiment is functionally provided with the data receiver 26 and the data storage 27 detailed in the first embodiment, but is not provided with the check list DB 21, the data list receiver 22, the data compatibility checker 23, the request list generator 24, and the request list transmitter 25.

The server apparatus 320 of the information communication system 3 is a server apparatus configured to relay the data transfer from the cellular phone 10 to the cellular phone 20, and is functionally comprised of a check list DB 321, a data list receiver 322, a data compatibility checker 323, a request list generator 324, a request list transmitter 325, a data receiver 326, a data storage 327, a data converter-processor 328, a data extractor 329, and a data transmitter 330. Each of the components will be described below in detail.

The check list DB 321 (corresponding to the list storage means) stores as a check list a list of the content data compatible between the cellular phone 10 and the cellular phone 20.

The data list receiver 322 (corresponding to the list receiving means) receives the data list transmitted from the data list transmitter 13 of the cellular phone 10.

The data compatibility checker 323 collates the data list received by the data list receiver 322, with the check list acquired from the check list DB 321 to determine whether the content data listed in the data list has data compatibility in the cellular phone 20.

The request list generator 324 (corresponding to the data selecting means) selects the content data with data compatibility on the basis of the result of the determination on the data compatibility by the data compatibility checker 323 and generates the request list in which the selected content data is recorded.

The request list transmitter 325 transmits the request list generated by the request list generator 324, to the cellular phone 10.

The data receiver 326 (corresponding to the data receiving means), the data storage 327, the data converter-processor 328 (corresponding to the data converting means), the data extractor 329 (corresponding to the data extracting means), and the data transmitter 330 (corresponding to the data transmitting means) are much the same as the data receiver 304, the data storage 305, the data converter-processor 308, the data extractor 309, and the data transmitter 310, respectively, which were detailed in the second embodiment. Therefore, the detailed description thereof is omitted herein.

The principal operations in the present embodiment including the compatibility check processing, the request list generating processing, the data extracting processing, etc. executed in the information communication system 3 are, though the subject is different, much the same as the respective processes of S4, S5, and S8 detailed in the first embodiment, and the illustration and detailed description thereof is omitted herein.

According to the information communication system 3 in the present embodiment, as described above, the various data is transmitted and received through the server apparatus 320, for transferring the content data from the cellular phone 10 to the cellular phone 20. On this occasion, the server apparatus 320 performs the compatibility check processing and the request list generating processing, in addition to the reception of the data list and the transmission of the content data. Namely, the cellular phone 20 does not execute the compatibility check processing and the request list generating processing. Therefore, the data transfer processing according to the present invention can also be applied to cellular phones without the function of executing each of the above processes. The present embodiment can reduce the processing load due to the execution of each of the above processes on the cellular phones.

The information communication system 3 is applicable to the transfer of data to a plurality of cellular phones, and in this case the server apparatus 320 has to store (register) checklists corresponding to all the cellular phones 20 assumed as data destinations, in the check list DB in advance. In this case, the user of the server apparatus 320 sets correspondence between the data destination cellular phones and information of model names and others for specifying the check lists used.

Fourth Embodiment

The information communication system in the third embodiment is preferably configured in the following modified form, in order to avoid the inconvenience of storing the check lists corresponding to all the cellular phones assumed as destinations.

The information communication system in the fourth embodiment of the present invention will be described below. The information communication system in the present embodiment includes the transmission-side mobile unit, the reception-side mobile unit, and the server apparatus according to the present invention. The information communication system in the present embodiment is different from that in the third embodiment in that the reception-side mobile unit has the aforementioned check list DB.

First, the configuration of the information communication system 4 in the present embodiment will be described. The information communication system 4 is comprised of the cellular phone 10, the cellular phone 20, and the server apparatus 340. The hardware configuration of the cellular phones 10, 20 is much the same as that of the cellular phones 10, 20 in the first embodiment described with FIG. 1. The hardware configuration of the server apparatus 340 is much the same as the hardware configuration of the server apparatus 300 in the second embodiment described with FIG. 19.

FIG. 22 is a system configuration diagram of the information communication system 4 according to the present embodiment. The cellular phone 10 of the information communication system 4 has much the same fundamental configuration as the cellular phone 10 detailed in the first embodiment. The cellular phone 20 in the present embodiment is functionally provided with the check list DB 21, the data receiver 26, and the data storage 27, which were detailed in the first embodiment, and is newly equipped with a check list transmitter 28. The check list transmitter 28 transmits the check list corresponding to the cellular phone 20, stored in the check list DB 21, to the server apparatus 340.

The server apparatus 340 is a server apparatus configured to relay the transfer of data from the cellular phone 10 to the cellular phone 20, and is functionally comprised of a check list receiver 341, a data list receiver 342, a data compatibility checker 343, a request list generator 344, a request list transmitter 345, a data receiver 346, a data storage 347, a data converter-processor 348, a data extractor 349, and a data transmitter 350. Each of the components will be described below in detail.

The check list receiver 341 (corresponding to the check list receiving means) receives the check list transmitted from the check list transmitter 28 of the cellular phone 20.

The data list receiver 342 (corresponding to the data list receiving means), the data compatibility checker 343, the request list generator 344 (corresponding to the data selecting means), and the request list transmitter 345 are much the same as the data list receiver 322, the data compatibility checker 323, the request list generator 324, and the request list transmitter 325, respectively, which were detailed in the third embodiment, and thus the detailed description thereof is omitted herein.

Furthermore, the data receiver 346 (corresponding to the data receiving means), the data storage 347, the data converter-processor 348 (corresponding to the data converting means), the data extractor 349 (corresponding to the data extracting means), and the data transmitter 350 (corresponding to the data transmitting means) are much the same as the data receiver 304, the data storage 305, the data converter-processor 308, the data extractor 309, and the data transmitter 310, respectively, which were detailed in the second embodiment, and the detailed description thereof is omitted herein.

The principal operations in the present embodiment including the compatibility check processing, the request list generating processing, the data extracting processing, etc. executed in the information communication system 4 are, though the subject is different, much the same as the respective processes of S4, S5, and S8 detailed in the first embodiment, and the illustration and detailed description thereof is omitted herein.

According to the information communication system 4 in the present embodiment, as described above, the various data is transmitted and received through the server apparatus 340, for transferring the content data from the cellular phone 10 to the cellular phone 20. The server apparatus 340 receives the check list corresponding to the cellular phone 20, from the cellular phone 20, prior to the execution of the compatibility check processing and the request list generating processing. Namely, the server apparatus 340 is not provided with the check list DB. In this configuration, the server apparatus 340 does not have to store the check lists corresponding to all the cellular phones 20 assumed as destinations, in the check list DB, and thus this configuration is particularly suitable for the case where the data is transferred to a plurality of cellular phones. When the check list transmitted from the cellular phone 20 includes the information about the model name of the cellular phone as a data destination and others, the check list used can be identified without need for the user of the server apparatus 340 to set the information about the model name and others.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A transmission-side mobile unit comprising:
   data storage means for storing data;
   List-transmitting means for transmitting a data list of data stored in said data storage means, to a reception-side mobile unit;
   data extracting means for extracting data selected out of the data list transmitted by said list transmitting means, from said data storage means in response to a request from the reception-side mobile unit; and
   data transmitting means for transmitting the data extracted by said data extracting means, to the reception-side mobile unit.

2. A reception-side mobile unit comprising:
   list receiving means for receiving a data list from the transmission-side mobile unit as set forth in claim 1;
   list storage means for storing a check list for determining data compatibility in the reception-side mobile unit;
   data selecting means for collating the data list received by the list receiving means, with the check list stored in the list storage means to select data with data compatibility in the reception-side mobile unit; and
   data receiving means for receiving the data selected by said data selecting means, from the transmission-side mobile unit.

3. An information communication method of implementing transmission and reception of data between a transmission-side mobile unit and a reception-side mobile unit, said information communication method comprising:
   a list transmitting step wherein the transmission-side mobile unit transmits a data list of data stored in data storage means, to the reception-side mobile unit;

a list receiving step wherein the reception-side mobile unit receives the data list transmitted from the transmission-side mobile unit in said list transmitting step;

a data-selecting step wherein the reception-side mobile unit collates the data list received in said list receiving step, with a check list for determining data compatibility in the reception-side mobile unit to select data with data compatibility in the reception-side mobile unit;

a data extracting step wherein the transmission-side mobile unit extracts data selected out of the data list transmitted in the list transmitting step, from the data storage means in response to a request from the reception-side mobile unit;

a data transmitting step wherein the transmission-side mobile unit transmits the data extracted in the data extracting step, to the reception-side mobile unit; and a data-receiving step wherein the reception-side mobile unit receives the data transmitted in the data-transmitting step, from the transmission-side mobile unit.

4. A transmission-side mobile unit comprising:

data storage means for storing data;

List-transmitting means for transmitting a data list of data stored in said data storage means, to a server apparatus;

data extracting means for extracting data selected out of the data list transmitted by the list transmitting means, from the data storage means; and data transmitting means for transmitting the data extracted by the data extracting means, to the server apparatus.

5. A reception-side mobile unit comprising:

list receiving means for receiving a data list from a server apparatus;

list storage means for storing a check list for determining data compatibility in a reception-side mobile unit;

data selecting means for collating the data list received by the list receiving means, with the check list stored in the list storage means to select data with data compatibility in the reception-side mobile unit; and data-receiving means for receiving the data selected by the data selecting means, from the server apparatus.

6. A server apparatus configured to implement transmission and reception of data to and from the transmission-side mobile unit as set forth in claim 4 and a reception-side mobile unit comprising:

list receiving means for receiving a data list from a server apparatus;

list storage means for storing a check list for determining data compatibility in a reception-side mobile unit;

data selecting means for collating the data list received by the list receiving means, with the check list stored in the list storage means to select data with data compatibility in the reception-side mobile unit; and data receiving means for receiving the data selected by the data selecting means, from the server apparatus, said server apparatus comprising:

data receiving means for receiving data transmitted from the data transmitting means of the transmission-side mobile unit;

data extracting means for extracting data to be transmitted to the reception-side mobile unit, out of the data received by the data receiving means, in response to a request from the reception-side mobile unit; and data transmitting means for transmitting the data extracted by the data extracting means, to the reception-side mobile unit.

7. An information communication method in which a transmission-side mobile unit implements transmission and reception of data to and from a server apparatus, said information communication method comprising:

a list transmitting step wherein the transmission-side mobile unit transmits a data list of data stored in data storage means, to the server apparatus;

a data extracting step wherein the transmission-side mobile unit extracts data selected out of the data list transmitted in said list transmitting step, from the data storage means; and a data transmitting step wherein the transmission-side mobile unit transmits the data extracted in the data extracting step, to the server apparatus.

8. An information communication method in which a reception-side mobile unit implements transmission and reception of data to and from a server apparatus, said information communication method comprising:

a list receiving step wherein the reception-side mobile unit receives a data list from the server apparatus;

a data selecting step wherein the reception-side mobile unit collates the data list received in said list receiving step, with a check list for determining data compatibility in the reception-side mobile unit to select data with data compatibility in the reception-side mobile unit; and a data receiving step wherein the reception-side mobile unit receives the data selected in said data selecting step, from the server apparatus.

9. An information communication method in which a server apparatus implements transmission and reception of data to and from a transmission-side mobile unit and a reception-side mobile unit, said information communication method comprising:

a data receiving step wherein the server apparatus receives data transmitted from the transmission-side mobile unit;

a data extracting step wherein the server apparatus extracts data to be transmitted to the reception-side mobile unit, out of the data received in said data receiving step, in response to a request from the reception-side mobile unit; and a data transmitting step wherein the server apparatus transmits the data extracted in said data extracting step, to the reception-side mobile unit.

10. A server apparatus configured to implement transmission and reception of data to and from a transmission-side mobile unit and a reception-side mobile unit, said server apparatus comprising:

list receiving means for receiving a data list from the transmission-side mobile unit;

list storage means for storing a check list for determining data compatibility in the reception-side mobile unit;

data selecting means for collating the data list received by the list receiving means, with the check list stored in the list storage means to select data with data compatibility in the reception-side mobile unit;

data receiving means for receiving the data selected by the data selecting means, from the transmission-side mobile unit;

data extracting means for extracting data to be transmitted to the reception-side mobile unit, out of the data received by said data receiving means; and data transmitting means for transmitting the data extracted by said data extracting means, to the reception-side mobile unit.

11. The server apparatus according to claim 10, further comprising data converting means for converting or processing the data received by said data receiving means, into data with data compatibility in the reception-side mobile unit,
  wherein said data extracting means extracts the data to be transmitted to the reception-side mobile unit, but of the data into which said data converting means converted or processed the received data.

12. An information communication system comprising a transmission-side mobile unit, a reception-side mobile unit, and the server apparatus as set forth in claim 10, and configured to implement transmission and reception of data between the transmission-side mobile unit and the server apparatus and between the server apparatus and the reception-side mobile unit.

13. An information communication method in which a server apparatus implements transmission and reception of data to and from a transmission-side mobile unit and a reception-side mobile unit, said information communication method comprising:
  a list receiving step wherein the server apparatus receives a data list from the transmission-side mobile unit;
  a data selecting step wherein the server apparatus collates the data list received in said list receiving step, with a check list for determining data compatibility in the reception-side mobile unit to select data with data compatibility in the reception-side mobile unit;
  a data receiving step wherein the server apparatus receives the data selected in said data selecting step, from the transmission-side mobile unit;
  a data extracting step wherein the server apparatus extracts data to be transmitted to the reception-side mobile unit, out of the data received in said data receiving step; and
  a data-transmitting step of transmitting the data extracted in said data extracting step, to the reception-side mobile unit.

14. A server apparatus configured to implement transmission and reception of data to and from a transmission-side mobile unit and a reception-side mobile unit, said server apparatus comprising:
  data list receiving means for receiving a data list from the transmission-side mobile unit;
  check list-receiving means for receiving a check list for determining data compatibility in the reception-side mobile unit, from the reception-side mobile unit;
  data selecting means for collating the data list received by said data list receiving means, with the check list received by said check list receiving means, to select data with data compatibility in the reception-side mobile unit;
  data receiving means for receiving the data selected by said data selecting means, from the transmission-side mobile unit;
  data extracting means for extracting data to be transmitted to the reception-side mobile unit, out of the data received by said data receiving means; and
  data transmitting means for transmitting the data extracted by said data extracting means, to the reception-side mobile unit.

15. The server apparatus according to claim 14, further comprising data converting means for converting or processing the data received by said data receiving means, into data with data compatibility in the reception-side mobile unit,
  wherein said data extracting means extracts the data to be transmitted to the reception-side mobile unit, out of the data into which said data converting means converted or processed the received data.

16. A reception-side mobile unit configured to implement transmission and reception of data to and from the server apparatus as set forth in claim 14, said reception-side mobile unit comprising:
  check list storage means for storing a check list; and
  List-transmitting means for transmitting the check list stored in said check list storage means, to the server apparatus.

17. An information communication system comprising a transmission-side mobile unit, a reception-side mobile unit, and the server apparatus as set forth in claim 14, and configured to implement transmission and reception of data between the transmission-side mobile unit and the server apparatus and between the server apparatus and the reception-side mobile unit.

18. An information communication method in which a server apparatus implements transmission and reception of data to and from a transmission-side mobile unit and a reception-side mobile unit, said information communication method comprising:
  a data list receiving step of receiving a data list from the transmission-side mobile unit;
  a check list-receiving step of receiving a check list for determining data compatibility in the reception-side mobile unit, from the reception-side mobile unit;
  a data-selecting step of collating the data list received in said data list receiving step, with the check list received in said check list receiving step, to select data with data compatibility in the reception-side mobile unit;
  a data-receiving step of receiving the data selected in said data selecting step, from the transmission-side mobile unit;
  a data extracting step of extracting data to be transmitted to the reception-side mobile unit, out of the data received in said data receiving step; and
  a data-transmitting step of transmitting the data extracted in said data extracting step, to the reception-side mobile unit.

* * * * *